(12) United States Patent
Suto et al.

(10) Patent No.: US 7,505,678 B2
(45) Date of Patent: Mar. 17, 2009

(54) CONTROL APPARATUS, CONTROL METHOD, AND COMPUTER PROGRAM

(75) Inventors: Hidekazu Suto, Tokyo (JP); Yujiro Ito, Kanagawa (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 11/373,957

(22) Filed: Mar. 14, 2006

(65) Prior Publication Data

US 2006/0233541 A1 Oct. 19, 2006

(30) Foreign Application Priority Data

Apr. 15, 2005 (JP) ............................. 2005-118349

(51) Int. Cl.
*G03B 3/00* (2006.01)

(52) U.S. Cl. ...................... 396/89; 396/93; 396/101; 396/102; 396/124; 348/345; 348/348; 348/349; 348/351

(58) Field of Classification Search ................. 396/89, 396/93, 102, 103, 124, 139, 101; 348/345, 348/348, 349, 351, 354
See application file for complete search history.

(56) References Cited

U.S. PATENT DOCUMENTS

| | | | | |
|---|---|---|---|---|
| 4,922,346 A | * | 5/1990 | Hidaka et al. | 348/355 |
| 5,319,462 A | * | 6/1994 | Haruki et al. | 348/347 |
| 6,222,588 B1 | * | 4/2001 | Yamazaki et al. | 348/355 |
| 6,362,852 B2 | * | 3/2002 | Ito | 348/345 |
| 2002/0154241 A1 | * | 10/2002 | Ohkawara | 348/345 |
| 2005/0249488 A1 | * | 11/2005 | Takei | 396/101 |
| 2005/0285968 A1 | * | 12/2005 | Sugimori | 348/345 |

FOREIGN PATENT DOCUMENTS

| | | |
|---|---|---|
| JP | 10-161016 | 6/1998 |
| JP | 10-215403 | 8/1998 |
| WO | WO97/25812 | 7/1997 |

* cited by examiner

*Primary Examiner*—W. B. Perkey
*Assistant Examiner*—Warren K Fenwick
(74) *Attorney, Agent, or Firm*—Oblon, Spivak, McClelland, Maier & Neustadt, P.C.

(57) ABSTRACT

A control apparatus for controlling a driver driving an optical element of an image pickup device to adjust a focus position of the image pickup device in the capturing of an image of a subject, includes a focus position control process startup unit for managing a startup of a focus position control process, a focus position control process executing unit for executing the focus position control process that is started under the control of the focus position control process startup unit, and a startup condition adjusting unit for adjusting a startup condition of the focus position control process, based on a change in a saturated luminance count contained in the image captured in the focus position control process.

14 Claims, 16 Drawing Sheets

CONTROL APPARATUS, CONTROL METHOD, AND COMPUTER PROGRAM

CROSS REFERENCES TO RELATED APPLICATIONS

The present invention contains subject matter related to Japanese Patent Application JP 2005-118349 filed in the Japanese Patent Office on Apr. 15, 2005, the entire contents of which are incorporated herein by reference.

BACKGROUND OF THE INVENTION

1. Field of the Invention

The present invention relates to a control apparatus, a control method, and a computer program. More particularly, the present invention relates to a control apparatus, a control method, and a computer program for easily reducing an unnecessary portion of auto-focus process.

2. Description of the Related Art

Known image pickup apparatuses are typically provided with an auto-focus (AF) function to automatically focus on a subject. International Patent Publication No. WO 97/25812 discloses a technique of AF process that detects a contrast of a captured image of a subject, and adjusts the position of a lens to reach the highest contrast (image processing technique). A captured image is in focus on the subject within a field of view.

The AF process is started when a user presses a shutter button half the stroke thereof, and is completed when the captured image is determined to be in focus on the subject. Such an AF process that is performed each time the user issues a command is referred to as a one-shot AF process.

An image pickup apparatus, such as a video camera, performs the AF process without any command from the user. Such an image pickup apparatus repeatedly performs condition determination operations in the AF process, and starts the above-referenced AF process when a predetermined condition is satisfied. One of startup conditions is a change in an assessment value of contrast. For example, an image pickup apparatus assesses contrast in a predetermined area (assessment frame) within the captured image, and starts the one-shot AF process when a change in the assessment value becomes equal to or above a threshold value. The image pickup apparatus can thus continuously be in focus on a subject within the assessment frame by assessing the contrast of the captured image and controlling the AF process based on the assessment value.

A variety of methods of performing appropriately the AF process is contemplated. For example, Japanese Unexamined Patent Application Publication No. 10-215403 discloses one technique in which a lens is wobbled within a tiny range to efficiently search for an optimum focus position and, and the direction of movement of the lens is determined based on an assessment value of the captured image. Japanese Unexamined Patent Application Publication No. 10-161016 discloses another technique. According to the disclosure, the size of an assessment frame over which an assessment value is calculated is modified based on conditions so that an optimum AF process is performed within a wide range of photographing conditions.

In such image processing type AF processes, the image pickup apparatus moves the lens to be in focus on the subject while viewing the captured image. A length of time is thus required before the AF process is completed (with in-focus state reached). For example, when the image pickup apparatus changes the direction of photographing (during panning or tilting), the subject within the assessment frame successively changes. From when the image pickup apparatus determines that the in-focus state to the subject has been reached in the AF process to when the AF process is actually completed by moving a lens to the in-focus state, distance to the subject photographed in the assessment frame can vary, leading to an unsuccessful focusing operation.

As shown in FIG. 1A, a camera 1 now pans, successively photographing a subject A, a subject B, and a subject C as represented by an arrow-headed curve line 2. Each of the distance 3 from the camera 1 to the subject A and the distance 5 from the camera 1 to the subject C is shorter than the distance 4 from the camera 1 to the subject B. The assessment value of the image captured by the camera 1 during panning changes a plot 6 of FIG. 6B.

The distance 4 is longer than the distance 3. The assessment value substantially drops at time t2 the subject B is photographed within the assessment frame, and the AF process is thus started. The panning continues, and the subject C is photographed in the assessment frame when the lens driving is almost ended. More specifically, the camera 1 fails to be in focus on the subject C with the focus position remaining in alignment with the distance 4. At time t3 thereafter, the assessment value becomes stabilized, keeping the AF process untriggered. The image is thus captured with the subject C out of focus. The same is true of a tilting operation.

Out-of-focus problems also take place in cases other than the panning and tilting operations. As shown in FIG. 2A, a subject 12 is photographed in an assessment frame 11 in a photographing frame 10. The subject 12 now repeatedly enters and the leaves the assessment frame 11 as a result of wind, thereby swinging laterally rather than fore and aft. The assessment value thus greatly varies as represented by a plot of FIG. 2B. The AF process is frequently started. In the AF process, lens is driven, causing the focus position to be moved. As a result, the captured image is hard to view with the focus position remaining unstable.

SUMMARY OF THE INVENTION

The controlling of a focus position at a fine step with a lens wobbled is contemplated to overcome the above-mentioned problems. In the AF process, the lens is initially driven at fine step (i.e., wobbled) to determine the direction of lens driving (i.e., to determine whether to drive the lens in a forward direction or a backward direction to achieve in-focus state). The lens driving direction is thus determined as a result of wobbling, and the lens is then actually driven in the determined direction.

By performing the wobbling operation frequently, a focus position control process is performed before a subject becomes too out-of-focus. With this arrangement, a process time required to perform the focus position control is thus substantially reduced. Even in the case of the panning operation (including the tilting operation) as shown in FIG. 1A, the camera is set successively to be in focus on the subject A, the subject B, and the subject C. In the case of professional cameras with large and heavy lenses, however, the wobbling speed is slow and the panning (tilting) speed is also slow. The effectiveness of such a technique cannot be sufficiently exploited.

The professional camera is typically used for a long period of time. In comparison with ordinary cameras, the professional camera is used in severe environments. If the wobbling operation is constantly performed under a severe environment, the camera can be damaged soon, leading a short service life.

In the case of FIGS. 2A and 2B, the wobbling operation is repeated and the focus position is finely vibrated. If the camera takes a high-definition picture, an even fine vibration in the focus position becomes pronounced in the high-definition picture. Image quality thus drops, causing a viewer to feel odd about the photographed image.

The size of the assessment frame can be enlarged not to start up the AF process in FIGS. 2A and 2B. For example, the entire photographing frame 10 is set as the assessment frame. The startup of the AF process is thus prevented because the assessment value of the camera is not changed even if the subject 12 is swung across the assessment frame. With this arrangement, the user cannot control the camera as to where to focus on within the photographing frame 10. The photographing operation can become difficult.

Another method can be contemplated to adaptively control the AF process with the assessment frame set to be variable in accordance with the (swinging) motion of the subject. However, it is still difficult to switch the assessment frame in a manner free from any problem, and a controller (control process) with a complex structure is obviously needed, leading to a substantial increase in manufacturing costs.

It is thus desirable to reduce an auto-focus process with unnecessary portion thereof eliminated.

A control apparatus of one embodiment of the present invention includes a focus position control process startup unit for managing a startup of a focus position control process, the focus position control process for controlling the focus position through controlling the driver in response to a change pattern of a relative angle variation, the relative angle variation being a change per unit time of a relative angle of the image pickup device with respect to the subject, a focus position control process executing unit for executing the focus position control process that is started under the control of the focus position control process startup unit, and a startup condition adjusting unit for adjusting a startup condition of the focus position control process, started by the focus position control process startup unit, based on a change in a saturated luminance count contained in the image captured in the focus position control process executed by the focus position control process executing unit.

Preferably, the focus position control process startup unit determines, based on a threshold value, whether a mode of the relative angle variation is a stable mode involving a small amount of change or an unstable mode involving a large amount of change, and manages the start of the focus position control process in response to a pattern of change of the mode.

Preferably, the startup condition adjusting unit adjusts the threshold value, as the startup condition, in response to the change in the saturated luminance count, and the focus position control process startup unit determines the mode of the relative angle variation using the threshold value adjusted by the startup condition adjusting unit.

Preferably, the startup condition adjusting unit adjusts the threshold value according to which the mode of the relative angle variation is shifted from the stable mode to the unstable mode.

Preferably, the startup condition adjusting unit includes a saturated luminance count calculator for calculating the saturated luminance count of the captured image on a per field basis, and a threshold selector for selecting the threshold value in response to the change in the saturate luminance count based on the maximum value and the minimum value of the saturated luminance count, each calculated on a per field basis by the saturated luminance count calculating means. The focus position control process startup unit determines the mode of relative angle variation using the threshold value selected by the threshold selector.

Preferably, the saturated luminance count calculator calculates, on a per field basis, the saturated luminance count of the image captured in the focus position control process during a wobbling operation.

A control method of one embodiment of the present invention includes a focus position control process executing step of executing a focus position control process for controlling a focus position through controlling a driver, a startup condition adjusting step of adjusting a startup condition of the focus position control process, based on a change in a saturated luminance count contained in an image captured in the focus position control process executed in the focus position control process executing step, a startup determination step of determining whether to start up the focus position control process, based on the startup condition adjusted in the startup condition adjusting step, and a change pattern of a relative angle variation, the relative angle variation being a change per unit time of a relative angle of the image pickup device with respect to the subject, and a focus position control process startup step of causing the driver to adjust the focus position through starting the focus position control process based on the determination result of the startup determination step.

A computer program product of one embodiment of the present invention includes a focus position control process executing step of executing a focus position control process for controlling a focus position through controlling a driver, a startup condition adjusting step of adjusting a startup condition of the focus position control process, based on a change in a saturated luminance count contained in an image captured in the focus position control process executed in the focus position control process executing step, a startup determination step of determining whether to start up the focus position control process, based on the startup condition adjusted in the startup condition adjusting step, and a change pattern of a relative angle variation, the relative angle variation being a change per unit time of a relative angle of the image pickup device with respect to the subject, and a focus position control process startup step of causing the driver to adjust the focus position through starting the focus position control process based on the determination result of the startup determination step.

In accordance with embodiments of the present invention, the focus position control process for controlling the driver to control the focus position is performed. The startup condition of the focus position control process is adjusted based on the change in the saturated luminance count contained in the image captured during the focus position control process. The startup of focus position control process is controlled based on the adjusted startup condition and the change pattern of the relative angle variation, the relative angle variation being the change in the relative angle of the image pickup device with respect to the subject.

The auto-focus process is easily reduced with unnecessary portion thereof eliminated.

DESCRIPTION OF THE PREFERRED EMBODIMENTS

Figure 1A:
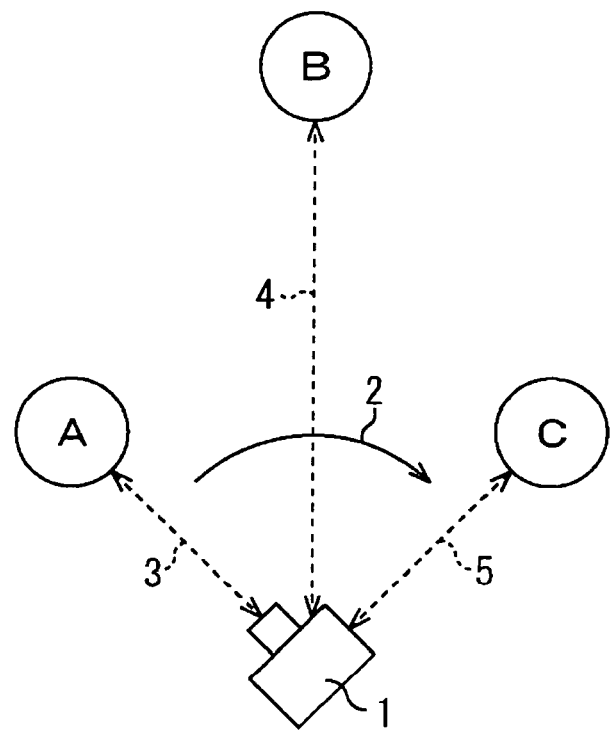
FIGS. 1A and 1B illustrate a known auto-focus process.
Figure 1B:
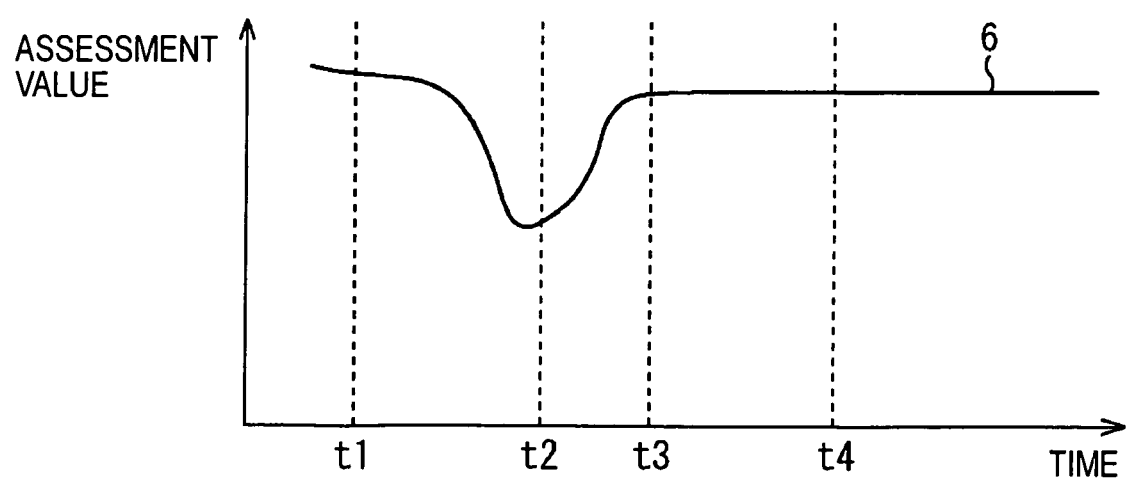
Figure 2A:
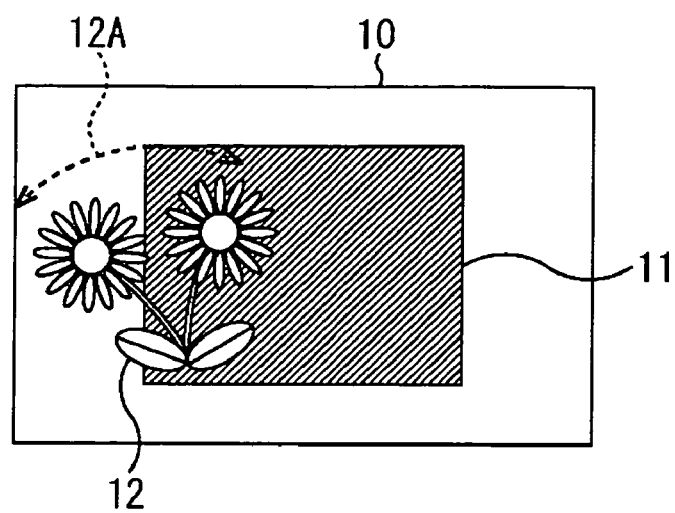
FIGS. 2A and 2B illustrate another known auto-focus process.
Figure 2B:
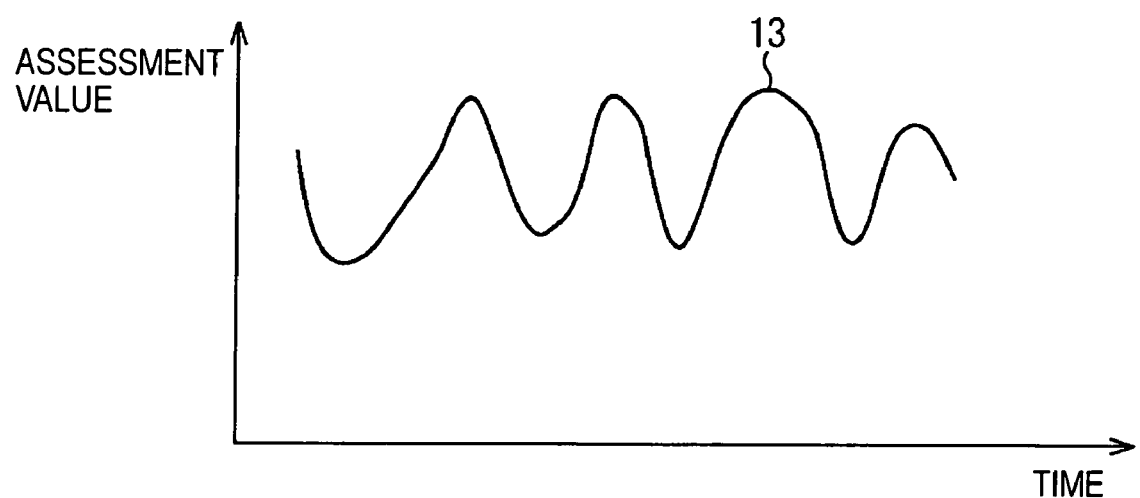

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A control apparatus (for example, a AF controller 53 of FIG. 3) of one embodiment of the present invention for controlling a driver (for example, an AF driver 51) driving an optical element (for example, a focusing lens 61 and a wobbling lens 62 of FIG. 3) of an image pickup device (for example, an image pickup apparatus 50) to adjust a focus position of the image pickup device in the capturing of an image of a subject, includes a focus position control process startup unit (for example, an AF startup controller 82) for managing a startup of a focus position control process, the focus position control process for controlling the focus position through controlling the driver in response to a change pattern of a relative angle variation, the relative angle variation being a change per unit time of a relative angle of the image pickup device with respect to the subject, a focus position control process executing unit (for example, an AF control processor 83 of FIG. 3) for executing the focus position control process that is started under the control of the focus position control process startup unit, and a startup condition adjusting unit (for example, a startup condition adjuster 84 of FIG. 3) for adjusting a startup condition of the focus position control process, started by the focus position control process startup unit, based on a change in a saturated luminance count contained in the image captured in the focus position control process executed by the focus position control process executing unit.

Figure 5:
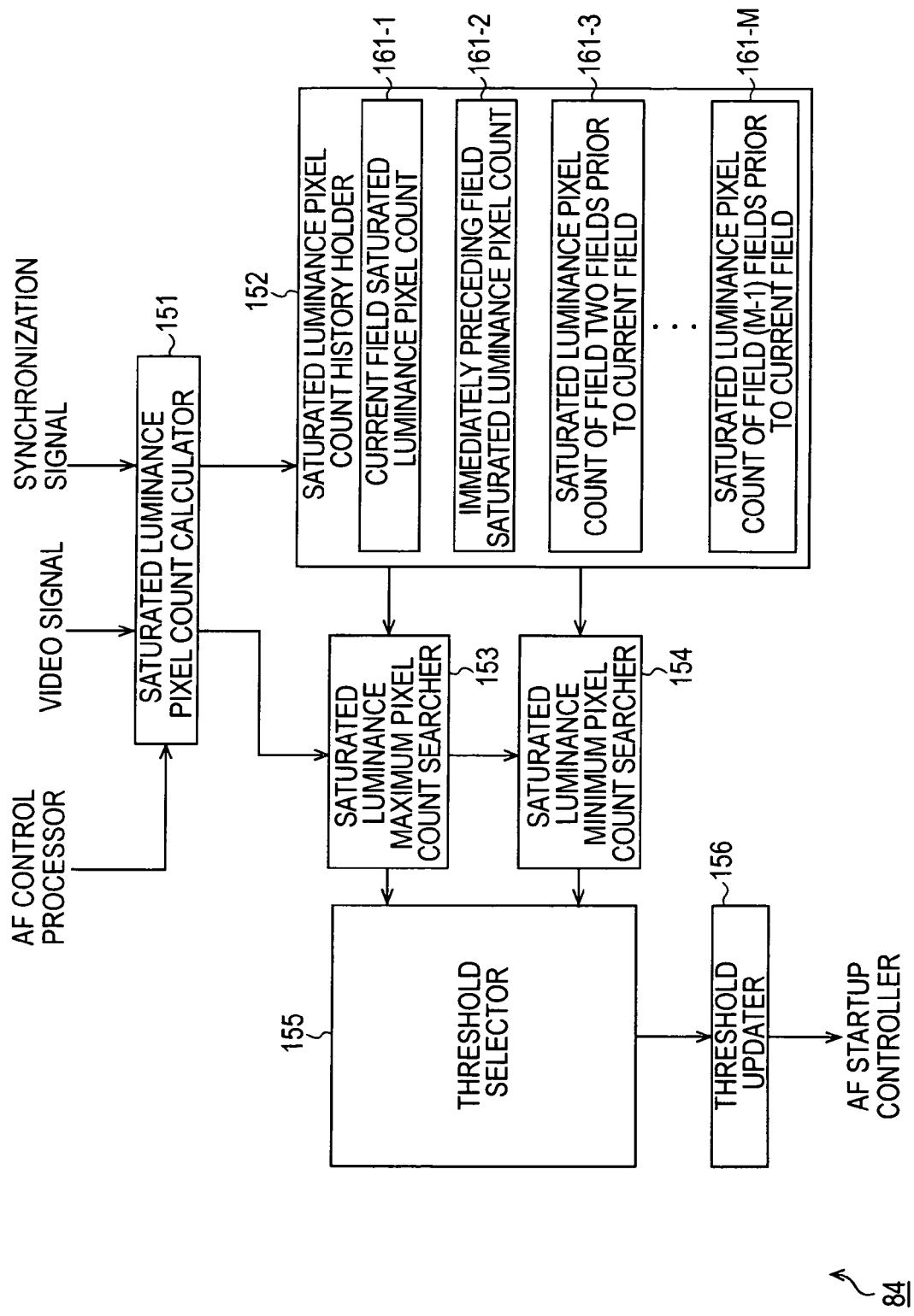
FIG. 5 is a block diagram illustrating in detail a startup condition adjuster of FIG. 3.

The startup condition adjusting unit includes a saturated luminance count calculator (for example, a saturated luminance pixel count calculator 151 of FIG. 5) for calculating the saturated luminance count of the captured image on a per field basis, and a threshold selector (for example, a threshold selector 155 of FIG. 5) for selecting the threshold value in response to the change in the saturate luminance count based on the maximum value and the minimum value of the saturated luminance count, each calculated on a per field basis by the saturated luminance count calculating means. The focus position control process startup unit determines the mode of relative angle variation using the threshold value selected by the threshold selector.

Figure 13:
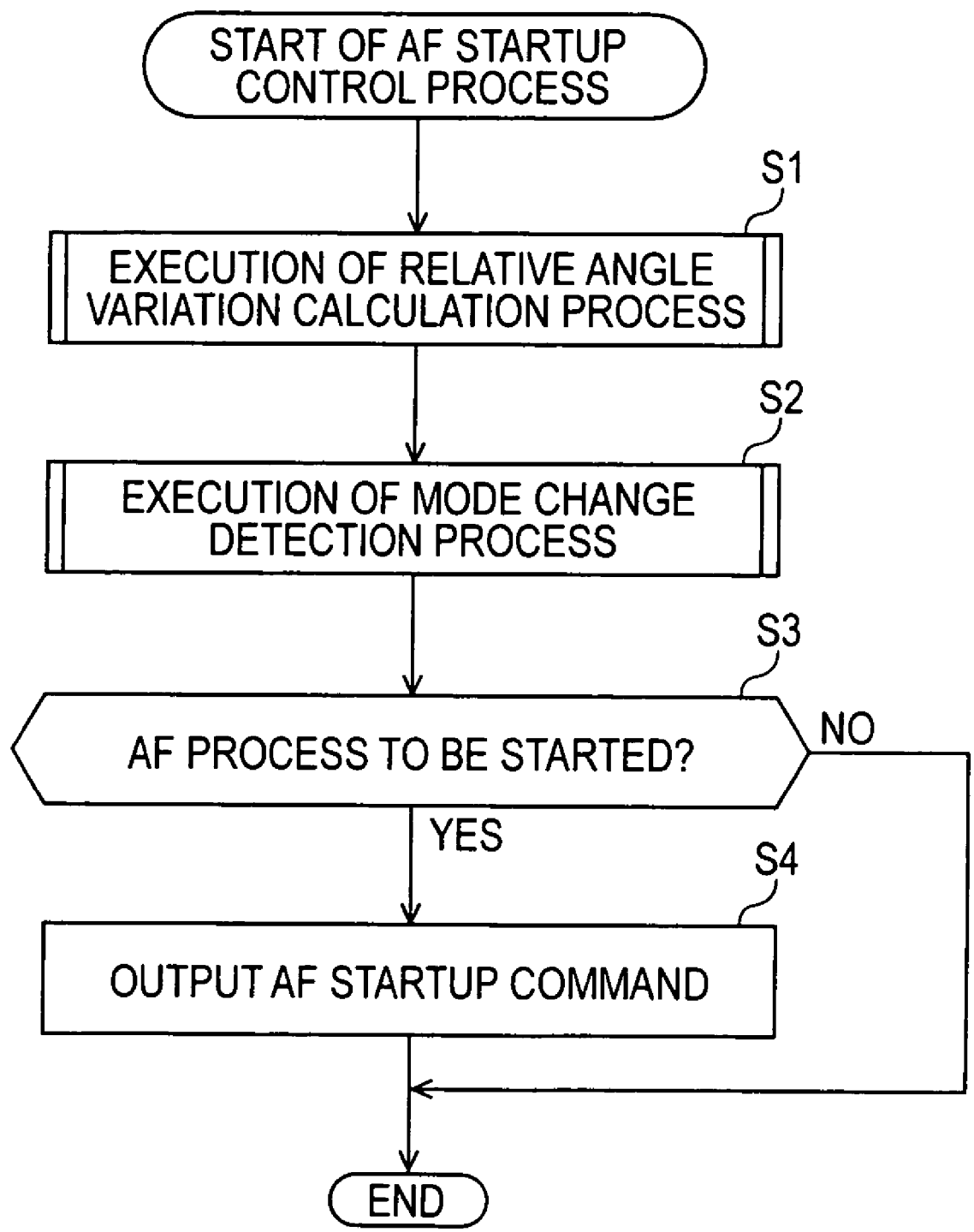
FIG. 13 is a flowchart illustrating an AF startup control process.

In accordance with one embodiment of the present invention, a control method of a control apparatus (for example, an AF controller 53 of FIG. 3) for controlling a driver (for example, an AF driver 51) driving an optical element (for example, a focusing lens 61 and a wobbling lens 62 of FIG. 3) of an image pickup device (for example, an image pickup apparatus 50) to adjust a focus position of the image pickup device in the capturing of an image of a subject, includes a focus position control process executing step of executing a focus position control process for controlling the focus position through controlling the driver (for example, in steps S61 through S64 of FIG. 16), a startup condition adjusting step of adjusting a startup condition of the focus position control process, based on a change in a saturated luminance count contained in an image captured in the focus position control process executed in the focus position control process executing step (for example, in steps of S81 through S89 of FIG. 17), a startup determination step of determining whether to start up the focus position control process, based on the startup condition adjusted in the startup condition adjusting step, and a change pattern of a relative angle variation, the relative angle variation being a change per unit time of a relative angle of the image pickup device with respect to the subject (for example, in steps S1 through S3 of FIG. 13), and a focus position control process startup step of causing the driver to adjust the focus position through starting the focus position control process based on the determination result of the startup determination step (for example, in step S4 of FIG. 13).

In accordance with one embodiment of the present invention, a computer program includes the steps as those of the above-described control method.

The embodiments of the present invention are described below with reference to the drawings.

Figure 3:
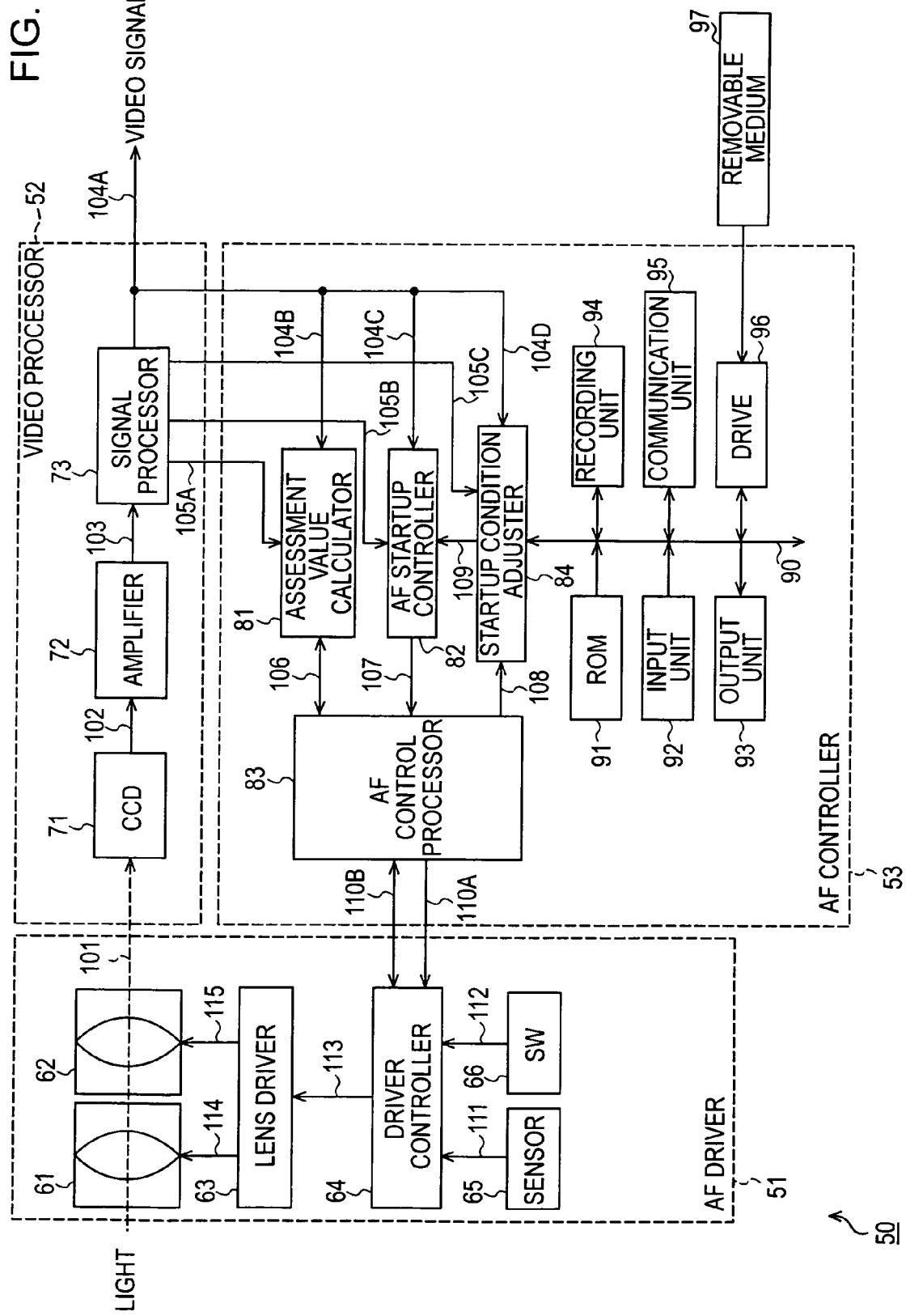
FIG. 3 illustrates an image pickup apparatus of one embodiment of the present invention.

FIG. 3 illustrates an image pickup apparatus 50 in accordance with one embodiment of the present invention.

As shown in FIG. 3, the image pickup apparatus 50 captures an image of a subject, and acquires video data of one of a moving image and a still image of the subject. The image pickup apparatus 50 includes an auto-focus (AF) driver 51, a video processor 52, and an AF controller 53. The image pickup apparatus 50 also records the acquired video data on a recording medium and outputs the video data to the outside.

FIG. 3 illustrates only elements in the image pickup apparatus 50 related to embodiments of the present invention.

The AF driver 51 includes a focusing lens 61, a wobbling lens 62, a lens driver 63, a driver controller 64, a sensor 65, and a switch (SW) 66. Under the control of the AF controller 53, the AF driver 51 drives an optical system, thereby performing a focus position adjustment process on light picked up by the video processor 52.

The focusing lens 61, moved along an optical axis direction of light incident on the video processor 52, controls a focus position of the incident light (focus position of a photographed image). The wobbling lens 62 is wobbled slightly along the optical axis direction of the light incident on the video processor 52 in order to move the focus position of the photographed image. The wobbling lens 62 is used to determine the direction of the movement of the focusing lens 61 during a focal adjustment process (focus process). The focusing lens 61 and the wobbling lens 62 may be integrated into a single lens unit (for example, the focusing lens 61 may be operated to wobble as the wobbling lens 62).

In response to control information supplied from the driver controller 64, the lens driver 63 controls the focus position by controlling the focusing lens 61 and the wobbling lens 62 in position and operation (i.e., operates the focusing lens 61 and the wobbling lens 62 to control the focus position). As will be described later, the driver controller 64 is connected to an AF control processor 83 in the AF controller 53 via a serial bus. The driver controller 64 supplies the lens driver 63 with the control information regarding the driving of the focusing lens 61 and the wobbling lens 62 in response to control information including a focus control command and a wobbling control command supplied from the AF control processor 83. The driver controller 64 supplies the control information to the lens driver 63, thereby commanding the lens driver 63 to move the focusing lens 61 in position and cause the wobbling lens 62 to start the wobbling operation.

The driver controller 64 supplies information regarding an iris value and a focus position from the sensor 65 to the AF control processor 83 via the serial bus. The driver controller 64 is controlled in response to the status of a switch (SW) 66. Only when the SW 66 is in an on state, the driver controller 64 performs the control process and a communication process. When the SW 66 is in an off state, the driver controller 64 pauses, performing no process.

The sensor 65 senses the focus position, a zoom position (focal length), and an iris value, and supplies these pieces of measurement information to the AF control processor 83 via the driver controller 64. The SW 66 is operated by a user to determine whether to perform the AF process, and notifies the driver controller 64 of the state of the SW 66.

The video processor 52 generates an electrical video signal in response to the light incident on the image pickup apparatus 50, and includes a charge-coupled device (CCD) 71, an amplifier 72 and a signal processor 73.

The CCD 71 is an image pickup device having photoelectrical conversion elements such as photodiodes. The CCD 71 photoelectrically converts the incident light entering through the focusing lens 61 and the wobbling lens 62, accumulates a charge responsive to a mount of input light, and then drains the charge, thereby resulting in the electrical video signal. The CCD 71 supplies the video signal to the amplifier 72. The amplifier 72 includes a correlated double sampling (CDS) circuit, an automatic gain control (AGC) circuit, and an analog-to-digital (A/D) converter circuit. The amplifier 72 removes reset noise in the video signal supplied from the CCD 71, amplifies the video signal, converts the video signal in analog form to a digital video signal, and then supplies the digital video signal to the signal processor 73.

The signal processor 73 performs an auto exposure (AE) process, an auto white balance (AWB) process and a γ correction process on the supplied video signal, and then supplies the resulting video signal to a subsequent circuit stage while supplying the resulting video signal to an assessment value calculator 81, an AF startup controller 82 and a startup condition adjuster 84, all in the AF controller 53. The signal processor 73 also supplies the assessment value calculator 81, the AF startup controller 82, and the startup condition adjuster 84 with control synchronization signals including a horizontal synchronization signal and a vertical synchronization signal of the video signal, and a system clock signal.

In response to the video signal supplied from the video processor 52, the AF controller 53 controls the AF driver 51, thereby performing a control process relating to the control of the AF process. The AF controller 53 includes the assessment value calculator 81, the AF startup controller 82, the AF control processor 83, and the startup condition adjuster 84.

The assessment value calculator 81 calculates an assessment value, assessing an out-of-focus level of the captured image (video signal) based on the video signal and the synchronization signals supplied from the signal processor 73 in the video processor 52 and setting data supplied from the AF control processor 83. The assessment value calculator 81 supplies the calculated assessment value to the AF control processor 83.

In response to the video signal and the synchronization signal, both supplied from the signal processor 73, the AF startup controller 82 performs a control process relating to the startup of the AF process, and then supplies the control result to the AF control processor 83. Under the control of the AF startup controller 82, the AF control processor 83 starts the AF process, executes the AF process in response to the assessment value supplied from the assessment value calculator 81, and then supplies control information to the driver controller 64 via the serial bus. The AF control processor 83 generates setting data regarding the calculation of the assessment value, and then supplies the setting data to the assessment value calculator 81. The AF control processor 83 retrieves sensor information such as the focus position and the iris value from the driver controller 64 via the serial bus. When the AF process is controlled, the AF control processor 83 first causes the startup condition adjuster 84 to adjust startup conditions of the AF process.

Upon receiving a start command of a startup condition adjustment process supplied from the AF control processor 83, the startup condition adjuster 84 adjusts the startup condition of the AF process for use in the AF startup control process of the AF startup controller 82 based on the video signal and the synchronization signal supplied from the signal processor 73. The startup condition adjuster 84 supplies the adjusted startup condition to the AF startup controller 82 to be used in the AF startup control process.

The AF controller 53 further includes a bus 90, a read-only memory (ROM) 91, an input unit 92, an output unit 93, a recording unit 94, a communication unit 95, and a drive 96. The startup condition adjuster 84 is connected to the bus 90. Furthermore, the startup condition adjuster 84 is connected to the ROM 91 through the drive 96 via the bus 90.

The ROM 91 is a read-only memory, and pre-stores a program to be executed by the startup condition adjuster 84 and data. The program and data stored on the ROM 91 are read by the startup condition adjuster 84 via the bus 90 as necessary. The input unit 92, including input devices such as switches and buttons, receives command information input by a user, and supplies the command information to the startup condition adjuster 84 via the bus 90. The output unit 93 includes a display such as a light-emitting diode (LED), a liquid-crystal display (LCD), an electroluminescent display, or the like, and an audio output device such as a loudspeaker. The output unit 93 displays and outputs information supplied from the startup condition adjuster 84 via the bus 90.

The recording unit 94, including a hard disk, a semiconductor memory, or the like, stores a program to be executed by the startup condition adjuster 84 and data. The communication unit 95 includes a modem, a local-area network (LAN) adaptor, a universal serial bus (USB) interface, an institute of electrical and electronic engineers (IEEE) 1394 interface, a small computer system interface (SCSI), IEEE 802.11x adaptor, or the like. The communication unit 95 communicates with another apparatus via a network. For example, the communication unit 95 receives information from the other apparatus and supplies the received information to the startup condition adjuster 84 and transmits information from the startup condition adjuster 84 to the other apparatus.

The drive 96 is a read and write processing unit loaded with a removable medium 97, and reads data from and writes data onto the removable medium 97. The removable medium 97 includes a magnetic disk, an optical disk, a magneto-optical disk, a semiconductor memory, or the like. The drive 96 reads programs and data from the loaded removable medium 97, install the read program onto the recording unit 94 and supplies the read program to the startup condition adjuster 84 as necessary. The drive 96 stores programs and data, retrieved from the startup condition adjuster 84 via the bus 90, onto the loaded removable medium 97.

When the process of the startup condition adjuster 84 is performed using software, a program forming the software is installed from a recording medium or via network.

The recording medium storing the program may be the removable medium 97 supplied to the user separately from the body of the apparatus to supply the user with the program. The removable medium 97 may include one of a magnetic disk (including a floppy disk), an optical disk (such as compact-disk read-only memory (CD-ROM), a digital versatile disk (DVD), or the like), a magneto-optical disk (such as Mini-Disk (MO®)), and a semiconductor memory. The recording medium also includes one of the ROM 91 and the recording unit 94 (including one of a hard disk and a semiconductor memory), each of which is supplied in the apparatus body to the user.

The operation of the apparatus is described below.

When a photographing operation is started, the CCD 71 in the video processor 52 photoelectrically converts light entering through the focusing lens 61 and the wobbling lens 62 in the AF driver 51 along the optical axis represented by an arrow-headed broken line 101, thereby resulting in video information (video signal) in an electrical form. The CCD 71 supplies the video signal to the amplifier 72 as represented by an arrow-headed solid line 102. After amplifying the video signal in accordance with a predetermined method, the amplifier 72 supplies a resulting amplified video signal to the signal processor 73 as represented by an arrow-headed solid line 103. The signal processor 73 performs a video process on the supplied video signal and then supplies the processed video signal to a subsequent stage as represented by an arrow-headed solid line 104A while supplying the processed video signal to the assessment value calculator 81, the AF startup controller 82, and the startup condition adjuster 84 in the AF controller 53 as respectively represented by arrow-headed solid lines 104B through 104D. As represented by arrow-headed solid lines 105A through 105C, the signal processor 73 further supplies the synchronization signal to the assessment value calculator 81, the AF startup controller 82, and the startup condition adjuster 84, respectively.

The AF startup controller 82 performs a control process for starting the AF process (one-shot AF process) based on the video signal (content of a captured image) supplied from the signal processor 73. In response to a luminance value of the video signal, the AF startup controller 82 determines whether to perform the AF process. If a predetermined condition adjusted by the startup condition adjuster 84 is satisfied, the AF startup controller 82 issues a command to the AF control processor 83 to start the AF process as represented by an arrow-headed solid line 107.

When the command to start the AF process is issued, the AF control processor 83 performs a control process of the AF process together with the assessment value calculator 81 as represented by an arrow-headed solid line 106. More specifically, the assessment value calculator 81 calculates, in accordance with a predetermined calculation method, an assessment value assessing the out-of-focus level of a captured image corresponding to the video signal supplied from the signal processor 73, based on setting data supplied from the AF control processor 83. The assessment value indicates the magnitude of contrast in a portion of the image area (assessment frame) in a frame image, and is calculated based on the sum of high-frequency components of the luminance value in the assessment frame. Upon having calculated the assessment value, the assessment value calculator 81 supplies the assessment value to the AF control processor 83.

The AF control processor 83 controls a wobbling operation and a specific operation for the AF process including an optimum focus position detection performed using an up/down trend determination, based on the supplied assessment value and sensor information, such as a focus position and an iris value, supplied from the driver controller 64 via the serial bus as represented by an arrow-headed solid line 110B. Control information is supplied from the AF control processor 83 to the driver controller 64 via the serial bus as represented by an arrow-headed solid line 110A. Upon starting the AF control process, the AF control processor 83 issues a notification of an AF control process start to the startup condition adjuster 84 as represented by an arrow-headed solid line 108.

Upon being notified of the AF control process start by the AF control processor 83, the startup condition adjuster 84 sets a startup condition (threshold) of the AF process, and supplies the information regarding the startup condition (threshold) to the AF startup controller 82 for setting as represented by an arrow-headed solid line 109.

The driver controller 64 retrieves the sensor information, such as the focus position and the iris value, from the sensor 65 as represented by an arrow-headed solid line ill, and then supplies the sensor information to the AF control processor 83 via the serial bus as represented by an arrow-headed solid line 110B. The driver controller 64 receives a user command relating to the setting of the AF process from the SW 66 as represented by an arrow-headed solid line 112. In response to the command, the driver controller 64 receives the control information supplied from the AF control processor 83 via the serial bus as represented by the arrow-headed solid line 110A. The driver controller 64 performs a process responsive to the control information. The driver controller 64 supplies, to the lens driver 63, lens drive control information for commanding lens position, etc., as represented by an arrow-headed solid line 113. Based on the lens drive control information, the lens driver 63 drives the focusing lens 61 as represented by an arrow-headed solid line 114, and drives the wobbling lens 62 as represented by an arrow-headed solid line 115.

The image pickup apparatus 50 performs the AF process in this way.

Figure 4:
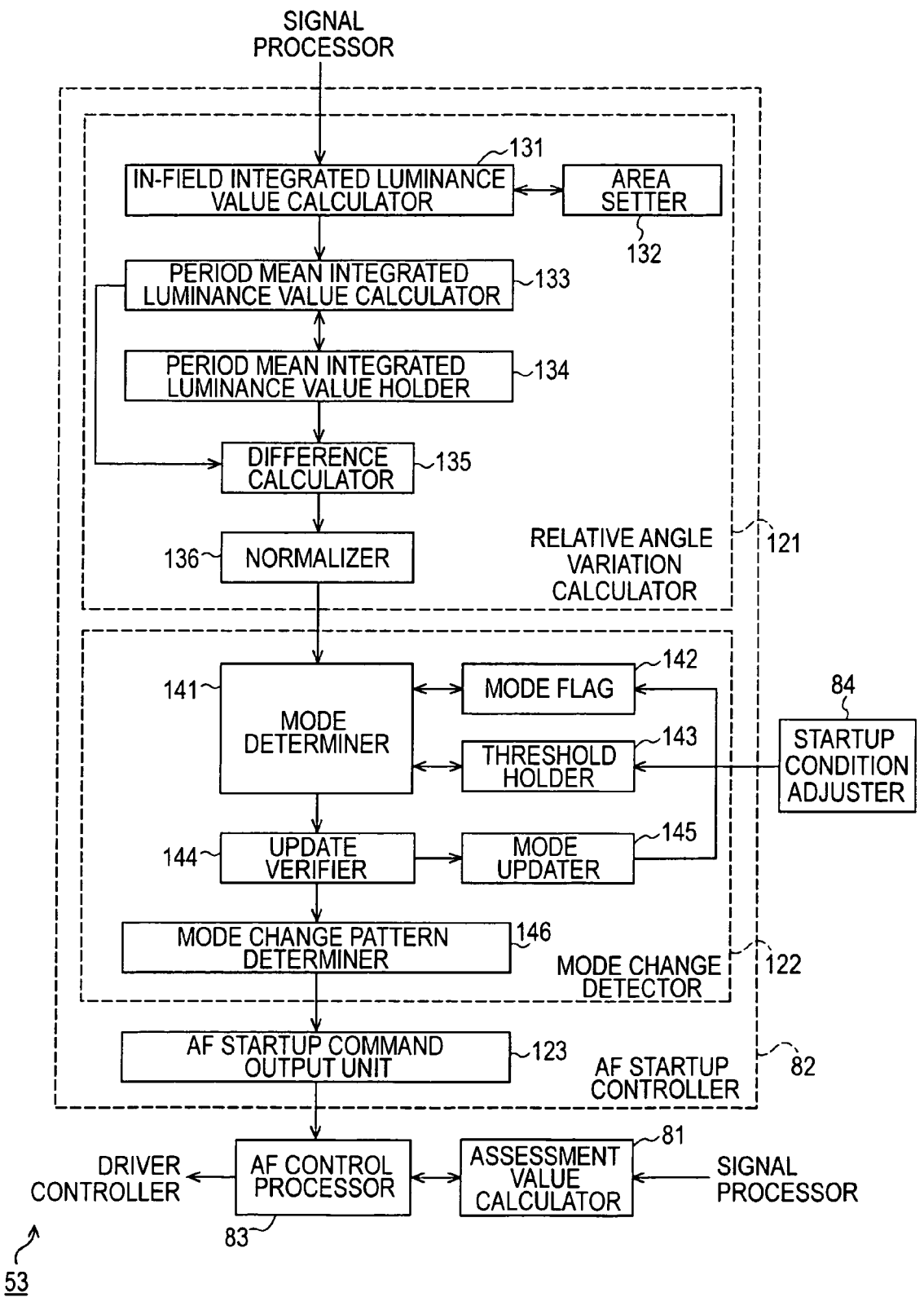
FIG. 4 is a block diagram illustrating in detail an AF startup controller of FIG. 3.

FIG. 4 is a block diagram illustrating in detail the AF startup controller 82 in the AF controller 53.

As shown in FIG. 4, the AF startup controller 82 includes a relative angle variation calculator 121, a mode change detector 122, and an AF startup command output unit 123.

The relative angle variation calculator 121 determines a change per period (unit time) in a relative angle of the image pickup apparatus 50 with respect to a subject (the relative angle being the relationship between the subject and photographing direction). The change is referred to as a relative angle variation p0. The relative angle variation calculator 121 includes an in-field integrated luminance value calculator 131, an area setter 132, a period mean integrated luminance value calculator 133, a period mean integrated luminance value holder 134, a difference calculator 135, and a normalizer 136.

The in-field integrated luminance value calculator 131 integrates (sums) the luminance value (y) of each pixel on a per field image (on a per frame image in the case of a progressive image), and calculates an integrated luminance value (in-field integrated luminance value ynow_w5_f0). The in-field integrated luminance value calculator 131 calculates the integrated luminance value of the pixels in an area set by the area setter 132 as an in-field integrated luminance value. The in-field integrated luminance value calculator 131 supplies the calculated in-field integrated luminance value ynow_w5_f0 to the period mean integrated luminance value calculator 133.

The area setter 132 sets the area over which the in-field integrated luminance value calculator 131 calculates the in-field integrated luminance value ynow_w5_f0. More specifically, the in-field integrated luminance value ynow_w5_f0 is the sum of the luminance values (integrated value) of the pixels within the predetermined area, the predetermined area being whole or part of a photographing frame.

The in-field integrated luminance value ynow_w5_f0 is thus an integrated luminance value per field supplied from the in-field integrated luminance value calculator 131. The period mean integrated luminance value calculator 133 averages the in-field integrated luminance values ynow_w5_f0 by a predetermined time (period) (for example, every N fields (N is a natural number)), thereby resulting in a period mean integrated luminance value yadd_w5_f0. The period mean integrated luminance value yadd_w5_f0 (including an interim calculation result) is supplied to the period mean integrated luminance value holder 134 for storage. Upon calculating one period mean integrated luminance value yadd_w5_f0, the period mean integrated luminance value calculator 133 supplies the value yadd_w5_f0 to the period mean integrated luminance value holder 134 for storage while also supplying the value add_w5_f0 to the difference calculator 135.

The period mean integrated luminance value yadd_w5_f0 is the mean value of current in-field integrated luminance values ynow_w5_f0 of the latest period (N fields). More specifically, the period mean integrated luminance value yadd_w5_f0 is the mean value of the in-field integrated luminance values ynow_w5_f0 of the fields from the field N fields before the current field all the way to the current field. The period mean integrated luminance value yadd_w5_f1 of the immediately prior field is the mean of the in-field integrated luminance values ynow_w5_f0 of the field from the field N+1 fields before the current field to the field two fields before the current field.

Upon calculating the latest period mean integrated luminance value yadd_w5_f0 (when the mean value of one period is completed), the period mean integrated luminance value holder 134 deletes the period mean integrated luminance value yadd_w5_f1 of the immediately prior field stored heretofore, changes the period mean integrated luminance value yadd_w5_f0 stored heretofore as the period mean integrated luminance value yadd_w5_f1 of the immediately prior field, and stores the latest period mean integrated luminance value yadd_w5_f0. The in-field integrated luminance value ynow_w5_f0 stored on the period mean integrated luminance value holder 134 and the period mean integrated luminance value yadd_w5_f0 in the middle of calculation thereof are updated on a per field basis.

The difference calculator 135 calculates a difference value between the latest period mean integrated luminance value yadd_w5_f0 thus calculated and the period mean integrated luminance value yadd_w5_f1 of the immediately prior field acquired from the period mean integrated luminance value holder 134 (yadd_w5_f0—yadd_w5_f1) and supplies the calculation result and the latest in-field integrated luminance value ynow_w5_f0 to the normalizer 136.

The normalizer 136 normalizes the difference value supplied from the difference calculator 135 using the latest in-field integrated luminance value ynow_w5_f0 and the field count N of one period, and supplies the normalized value, namely, a rate of change of the integrated luminance value as the relative angle variation p0 to a mode determiner 141 in the mode change detector 122.

The relative angle variation p0 is determined using the following equation (1):

$$p0 = \frac{yadd\_w5\_f0 - yadd\_w5\_f1}{ynow\_w5\_f0 \times N} \quad (1)$$

The mode change detector 122 determines a change in the content of a photographed image, namely, whether a mode of the relative angle variation has changed or not (mode change), based on the relative angle variation p0 calculated by the relative angle variation calculator 121. The mode change detector 122 includes a mode determiner 141, a mode flag 142, a threshold holder 143, an update verifier 144, a mode updater 145, and a mode change pattern determiner 146.

The mode determiner 141 determines the current mode based on the relative angle variation supplied from the normalizer 136 in the relative angle variation calculator 121. The mode herein refers to a class into which the change in the content of the photographed image is categorized according to the degree of change. There are two modes herein, namely, a stable mode and an unstable mode. Depending on the magnitude of the relative angle variation p0, the mode determiner 141 determines whether a subject moves greatly with respect to a photographing angle of the image pickup apparatus 50 (unstable mode) or not (stable mode). By referencing a mode flag 142, the mode determiner 141 identifies the mode of an immediately prior period, and acquires a threshold value corresponding to that mode from the threshold holder 143. The mode determiner 141 determines the mode of the current period from the relative angle variation using the threshold value. The mode determiner 141 supplies, to the update verifier 144, the determination result of mode and the mode of the immediately prior period read from the mode flag 142.

The mode determined by the mode determiner 141 is set in the mode flag 142. More specifically, the mode flag 142 is loaded with information (flag) indicating the stable mode or the unstable mode. The threshold holder 143 holds the threshold values (threshold values α and β set on a per mode basis) used when the mode determiner 141 determines mode. The threshold values held by the threshold holder 143 are values set by the startup condition adjuster 84.

The update verifier 144 determines, based on the information supplied from the mode determiner 141, whether mode is updated or not. The update verifier 144 then supplies the mode updater 145 and the mode change pattern determiner 146 with the determination result and the information regarding the mode of the current period determined by the mode determiner 141.

Upon being notified of the mode update by the update verifier 144, the mode updater 145 updates the value of the mode flag 142 to set a value indicating a new mode. If a value indicating the stable mode has been set in the mode flag 142, the mode updater 145 updates the value to a value indicating the unstable mode. If a value indicating the unstable mode has been set in the mode flag 142, the mode updater 145 updates the value to a value indicating the stable mode.

The mode change pattern determiner 146 determines the mode verified by the update verifier 144, namely, a pattern of the mode change. More specifically, the mode change pattern determiner 146 determines whether the mode is shifted from the stable mode to the unstable mode or from the unstable mode to the stable mode, and supplies the determination result to the AF startup command output unit 123.

The AF startup command output unit 123 outputs an AF startup command to the AF control processor 83 based on the determination result of the mode change pattern determiner 146 in the mode change detector 122. More specifically, only when the mode change pattern determiner 146 determines that the mode has shifted from the unstable mode to the stable mode, the AF startup command output unit 123 supplies the AF startup command as the control information to start the AF process to the AF control processor 83.

As described above, the AF startup controller 82 calculates the change in the relative angle of the camera with respect to the subject as a parameter for controlling the startup of the AF process of the relative angle variation calculator 121. The mode change detector 122 detects the pattern of the change in the mode change. The AF startup command output unit 123 outputs the startup command of the AF process to the AF control processor 83 in response to the mode change pattern.

FIG. 5 is a block diagram illustrating in detail the startup condition adjuster 84 in the AF controller 53 of FIG. 3.

As shown in FIG. 5, in response to a photographing condition (content of an image to be photographed), the startup condition adjuster 84 controls (adjusts) the threshold value for use in the mode determination stored in the threshold holder 143 in the AF startup controller 82.

Photoelectrical converting elements such as a photodiode are subject to limitation of luminance level at which quantization is normally performed. For example, if the amount of light from a subject is too intense, the luminance value becomes saturated, causing a "whitening saturation". More specifically, if an object, such as an illumination, causing a high amount of light, is contained in a subject, the luminance value of a pixel within the corresponding portion of the photographed image can be saturated. Even if dark and light portions are contained in the actual photographed image in practice, the luminance values in both the dark portion and the light portion rise above the upper limit of a quantization level. Both the dark portion and the light portion appear in white, and cannot be recognized in tonal gradation. This is called the whitening saturation."

As will be described later, if a pixel having an saturated luminance value is contained in the photographed image, the in-field integrated luminance value of the photographed image greatly changes in response to a change in the focus position taking place in the AF process, depending on the content of the image. This can lead to an unnecessary triggering of the AF process. The startup condition adjuster 84 adjusts the startup condition depending on the content of the photographed image (based on the saturated luminance of the photographed image).

To perform that process, the startup condition adjuster 84 includes a saturated luminance pixel count calculator 151, a saturated luminance pixel count history holder 152, a saturated luminance maximum pixel count searcher 153, a saturated luminance minimum pixel count searcher 154, a threshold selector 155, and a threshold updater 156.

When the AF control processor 83 issues a start command to start the AF process, the saturated luminance pixel count calculator 151 references the luminance value of each pixel based on the video signal and the synchronization signal, supplied from the signal processor 73, thereby calculating a saturated luminance pixel count representing the number of pixels having the luminance values thereof saturated in the field (frame in the case of the progressive image). More specifically, the saturated luminance pixel count calculator 151 calculates the saturated luminance pixel count of each field in the image currently photographed and wobbled in the AF process.

Upon calculating the saturated luminance pixel count, the saturated luminance pixel count calculator 151 successively supplies the calculated saturated luminance pixel count to the saturated luminance pixel count history holder 152 for storage. Upon calculating the saturated luminance pixel counts of M fields (M is any predetermined natural number), the saturated luminance pixel count calculator 151 completes the calculation of the saturated luminance pixel count, and notifies the saturated luminance maximum pixel count searcher 153 of the completion of the calculation of the saturated luminance pixel count.

The saturated luminance pixel count history holder 152 includes a semiconductor memory, such as a RAM (random-access memory), a hard disk, or the like, and has a storage area of a predetermined size. The saturated luminance pixel count history holder 152 stores the saturated luminance pixel counts of a maximum of M fields supplied from the saturated luminance pixel count calculator 151 as a history.

As shown in FIG. 5, the saturated luminance pixel count history holder 152 includes a current field saturated luminance pixel count 161-1, an immediately preceding field saturated luminance count 161-2, a saturated luminance pixel count of the field two fields prior to the current field 161-2, a saturated luminance pixel count of the field three fields prior to the current field 161-3, . . . , a saturated luminance pixel count of the field (M-1) fields prior to the current field 161-M (namely, the saturated luminance pixel counts of the latest M fields) as a history.

The saturated luminance pixel count history holder 152 successively stores the latest saturated luminance pixel count supplied until the saturated luminance pixel counts of the M fields are fully stored. After storing the saturated luminance pixel counts of the M fields, the saturated luminance pixel count history holder 152 deletes the oldest saturated luminance pixel count of the field (M-1) fields prior to the current field 161-M each time the newest saturated luminance pixel count is supplied, and then stores the latest saturated luminance pixel counts of the latest fields (in other words, updates the history of the stored saturated luminance pixel counts).

Upon being notified of the completion of the calculation by the saturated luminance pixel count calculator 151, the saturated luminance maximum pixel count searcher 153 references the history of the saturated luminance pixel counts stored on the saturated luminance pixel count history holder 152, searches for the maximum saturated luminance pixel count in history, and retrieves information regarding the maximum saturated luminance pixel count. The saturated luminance maximum pixel count searcher 153 supplies the information regarding the maximum saturated luminance pixel count to the threshold selector 155, and notifies the saturated luminance minimum pixel count searcher 154 of the completion of the search of the maximum saturated luminance pixel count.

Upon being notified of the completion of the maximum count search by the saturated luminance maximum pixel count searcher 153, the saturated luminance minimum pixel count searcher 154 references the history of the saturated luminance pixel counts stored on the saturated luminance pixel count history holder 152, searches for the minimum saturated luminance pixel count in history, and retrieves information regarding the minimum saturated luminance pixel count. The saturated luminance minimum pixel count searcher 154 supplies the information regarding the minimum saturated luminance pixel count to the threshold selector 155 while notifying the threshold selector 155 of the completion of the minimum saturated luminance pixel count search process.

Upon being notified of the completion of the minimum count process by the saturated luminance minimum pixel count searcher 154, the threshold selector 155 selects a threshold value for use in the mode determination of the relative angle variation (threshold stored on the threshold holder 143), based on the maximum count of the saturated luminance pixel counts supplied from the saturated luminance maximum pixel count searcher 153 (the maximum count of the saturated luminance pixel counts of the latest M fields), and the minimum count of the saturated luminance pixel counts supplied from the saturated luminance minimum pixel count searcher 154 (the minimum count of the saturated luminance pixel counts of the latest M fields). More specifically, the threshold selector 155 determines the change in the saturated luminance pixel count during the wobbling operation, using the following equation (2), and selects an optimum threshold value based on the determination result (the manner of the change of the saturated luminance pixel count during the wobbling operation):

(Maximum of the saturated luminance pixel counts of the latest M fields)/{(minimum of the saturated luminance pixel counts of the latest M fields)+ 1}>γ  (2)

wherein γ is any constant. In the denominator of equation (2), the value "1" is added to the minimum of the saturated luminance pixel counts of the latest M fields to prevent the denominator from becoming zero just in case the minimum is zero. The value "1" added herein is small enough to be negligible with respect to the minimum value. Instead of the value "1", any other value may also be added as long as the value is practicably negligible. For example, when the value of γ is set, the effect of the additive value may be taken into consideration.

If equation (2) is satisfied, namely, if the change (step of change) in the saturated luminance pixel count in the wobbling operation is large, the threshold selector 155 determines that a particular subject such as a bar-like saturated luminance subject to be discussed later is present. The threshold selector 155 selects, as a threshold value for use in the determination of shift from the stable mode to the unstable mode, a threshold value for the bar-like saturated luminance subject (3α), namely, the value equal to three times the threshold value α of an ordinary subject. If equation (2) is not satisfied, namely, if the change (step of change) of the saturated luminance pixel count is small, the threshold selector 155 determines that only an ordinary subject is present in the photographed image. The threshold selector 155 thus selects, as a threshold value for use in the determination of shift from the stable mode to the unstable mode, the threshold value α of the ordinary subject.

The bar-like saturated luminance subject will be described in more detail later. The threshold value for use in the determination of shift from the stable mode to the unstable mode will also be described in more detail later. The threshold value of the bar-like saturated luminance subject is set to be three times the threshold value of the ordinary subject (not the bar-like saturated luminance subject). However, this threshold value is only an example. Any threshold value is acceptable as long as the threshold value is larger than the threshold value of the ordinary subject (i.e., as long as the threshold value makes it more difficult for the mode to shift to shift from the stable mode to the unstable mode).

When the threshold value is selected in this way, the threshold selector 155 supplies information regarding the selected threshold value to the threshold updater 156. The threshold updater 156 updates the threshold value for use in the determination of the shift from the stable mode to the unstable mode stored on the threshold holder 143, with the threshold value supplied from the threshold selector 155.

Figure 6:
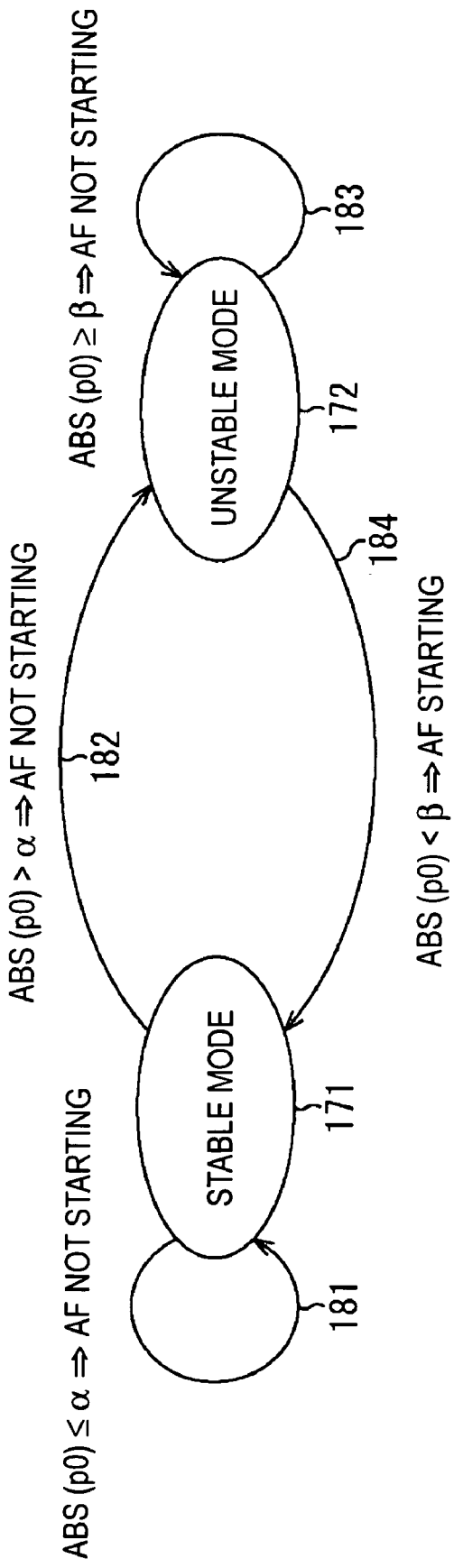
FIG. 6 diagrammatically illustrates the relationship between a mode shift determination and an AF startup.

A mode shift determination of the relative angle variation by the AF startup controller 82 is described below. The ordinary subject case with the photographed image containing no bar-like saturated luminance subject is described first. FIG. 6 diagrammatically illustrates the relationship between the mode shift determination and AF startup.

As shown in FIG. 6, modes of movement in the photographing angle of the image pickup apparatus 50 with respect to the subject (relative angle variation) include two modes, namely, a stable mode 171 and an unstable mode 172.

Let an immediately preceding mode be the stable mode 171. In such a case, the value indicating the stable mode 171 is set in the mode flag 142. The mode determiner 141 references the mode flag 142. When the mode determiner 141 determines that the mode is the stable mode 171, the mode determiner 141 retrieves the threshold value α for the stable mode from the threshold holder 143. Since the photographed image contains no bar-like saturated luminance subject (i.e., it is determined in the wobbling operation in the preceding AF process that the photographed image contains no bar-like saturated luminance subject), "α" is set as the threshold value for the stable mode.

The mode determiner 141 compares the absolute value (ABS p0) of the relative angle variation (normalized difference value) supplied from the normalizer 136 in the relative angle variation calculator 121 with the threshold value α. If it is determined that the absolute value is smaller than the threshold value α, the mode determiner 141 determines that the mode in the new period is also the stable mode 171. Since the mode is the stable mode 171 in both the immediately preceding period and the current period, no mode change takes place as represented by an arrow-headed curved line 181.

If the absolute value ABS (p0) of the relative angle variation is greater than the threshold value α, the mode determiner 141 determines that the mode in the new period is the unstable mode 172. More specifically, as a result of mode change, the mode has been shifted from the stable mode 171 in the immediately preceding period to the unstable mode 172 in the current period. The update verifier 144 verifies that the mode has shifted from the stable mode 171 to the unstable mode 172 as represented by an arrow-headed curved line 182, and the mode updater 145 updates the value in the mode flag 142.

Since the value indicative of the unstable mode 172 is set in the mode flag 142, the mode determiner 141 references the mode flag 142 to determine that the mode is the unstable mode 172. The mode determiner 141 then retrieves the threshold value β for the unstable mode from the threshold holder 143. The mode determiner 141 compares the absolute value ABS (p0) of the relative angle variation supplied from the normalizer 136 in the relative angle variation calculator 121 (normalized difference value) with the threshold value β. If the absolute value ABS (p0) of the relative angle variation is equal to or above the threshold value β, the mode determiner 141 determines that the mode in the new period is also the unstable mode 172. Since the modes in the immediately prior period and the current period are the unstable mode 172, no mode change takes place as represented by an arrow-headed curved line 183.

If the absolute value ABS (p0) of the relative angle variation is smaller than the threshold value β, the mode determiner 141 determines that the mode in the new period is the stable mode 171. More specifically, as a result of mode change, the mode has been shifted from the unstable mode 172 in the immediately preceding period to the stable mode 171 in the current period. The update verifier 144 verifies that the mode transition pattern is a transition from the unstable mode 172 to the stable mode 171 as represented by an arrow-headed curved line 184. The mode updater 145 then updates the value of the mode flag 142.

When the mode is shifted as one of arrow-headed curved lines 182 and 184, the mode change pattern determiner 146 determines the shift direction (mode change pattern). Based on the determination result, the AF startup command output unit 123 outputs the AF process start command to the AF control processor 83 only when the mode has been shifted from the unstable mode 172 to the stable mode 171 as represented by the arrow-headed curved line 184.

More specifically, if the absolute value ABS (p0) of the relative angle variation ≦α (as represented by the arrow-headed curved line 181), the absolute value ABS (p0) >α (as represented by the arrow-headed curved line 182) or the absolute value ABS (p0) ≧β (as represented by the arrow-headed curved line 183), the AF process is not started. Only if the absolute value ABS (p0) <β (as represented by the arrow-headed curved line 184), the AF process is started. More specifically, if the mode of the relative angle variation has been shifted from the unstable mode 172 to the stable mode 171 (if the change in the relative angle becomes gradually stabilized after a fluctuation period within which the relative angle greatly fluctuates), the AF process is started.

As an example of AF startup control process, a panning operation of the image pickup apparatus 50 is described below with reference to FIGS. 7A and 7B.

Figure 7A:
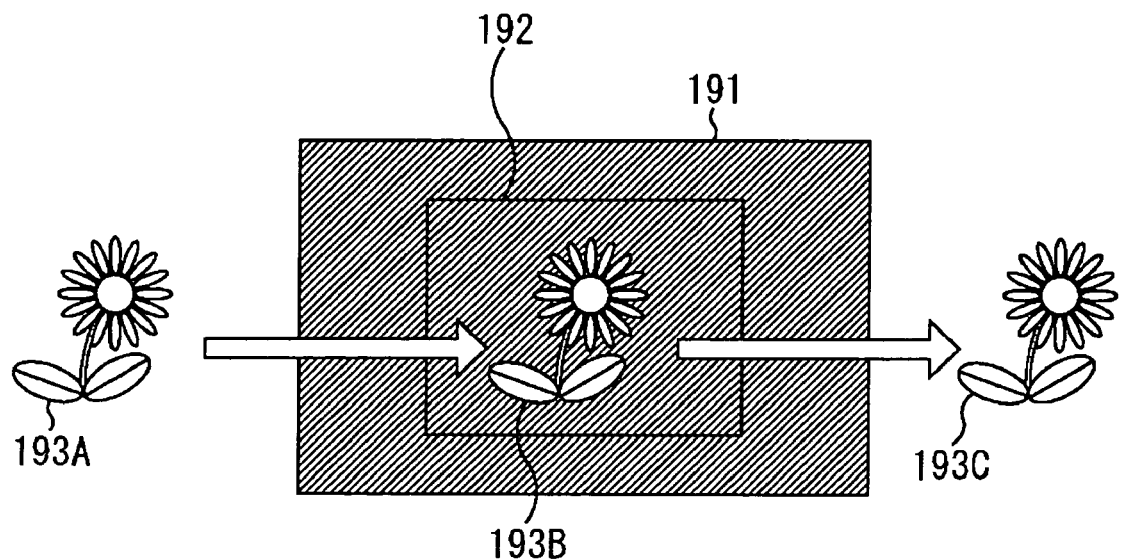
FIGS. 7A and 7B illustrate an AF startup control process of the image pickup apparatus of FIG. 3.

As shown in FIG. 7A, the image pickup apparatus 50 is panned from right to left (in the photographing direction) to photograph a subject. The subject, which was not present as a subject 193A in a photographed image to the left of a photographing frame 191, enters the photographing frame 191 as a subject 193B, and then leaves the photographing frame 191 from the left side thereof as a subject 193C.

An assessment frame 192, smaller than the photographing frame 191, is arranged in the center of the photographing frame 191. The assessment value of the photographed image is calculated within the assessment frame 192 while the in-field integrated luminance value is calculated within the entire photographing frame 191.

When the subject enters and leaves the assessment frame 192 (as the subject 193B), the assessment value changes greatly. When the AF process is started in response to a change in the assessment value, an attempt is made to focus on the subject that finally leaves the photographing frame 191. When a focus position is shifted, the subject is not present within the photographing frame 191, leading to an out-of-focus image. When the assessment value becomes stabilized after the panning operation ends, the AF process is not started, and the photographed image remains at an out-of-focus state.

Figure 7B:
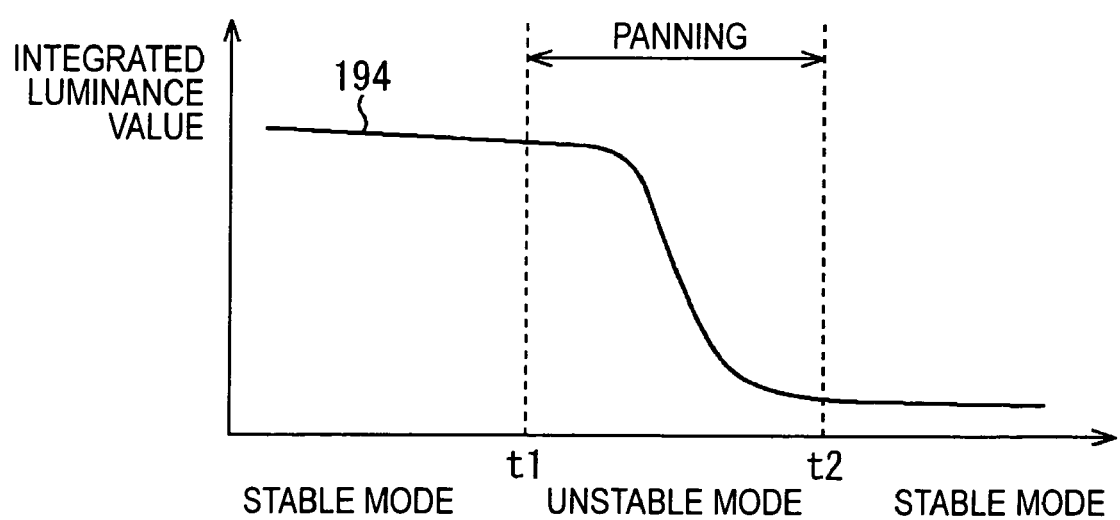

The in-field integrated luminance value changes as plotted by a curve 194 of FIG. 7B when the image pickup apparatus 50 pans as shown in FIG. 7A. As shown in FIG. 7B, the abscissa represents time while the ordinate represents the in-field integrated luminance value. For example, when the image pickup apparatus 50 pans from time t1 to time t2 as shown in FIG. 7A, the in-field integrated luminance value remaining stable to time t1 greatly changes within time length from time t1 to time t2. From time t2 thereafter, namely, from the end of the panning operation thereafter, the in-field integrated luminance value becomes again stabilized. More specifically, the image pickup apparatus 50, being stabled before time t1, was shifted to the unstable mode at time t1, and was then shifted back to the stable mode at time t2.

When the AF startup controller 82 controls the AF startup control using the in-field integrated luminance value (the absolute value ABS (p0) of the relative angle variation calculated from the in-field integrated luminance value), the AF process is performed only at time t2 (at the shifting timing from the unstable mode to the stable mode). More specifically, the relative angle variation as a dedicated parameter rather than the assessment value as a parameter controlling the focus position is used in the startup control for the AF process. The image pickup apparatus 50 (AF startup controller 82) easily reduces unnecessary portion of the AF process, thereby achieving a stable AF process. The image pickup apparatus 50 performs the AF startup control process in this way, thereby controlling unnecessary focusing operation to the subject (subject 193B) during panning. The image pickup apparatus 50 controls the out-of-focus image. The same is true of the tilting operation.

In the AF startup controller 82, as described above, the relative angle variation calculator 121 calculates the change in the relative angle of the camera with respect to the subject as the parameter for controlling the AF process startup, the mode change detector 122 detects the mode change pattern of the change, and the AF startup command output unit 123 outputs the startup command of the AF process to the AF control processor 83 based on the mode change pattern.

As an another example, the AF startup control with a subject swinging within the photographing frame 191 is described below.

Figure 8A:
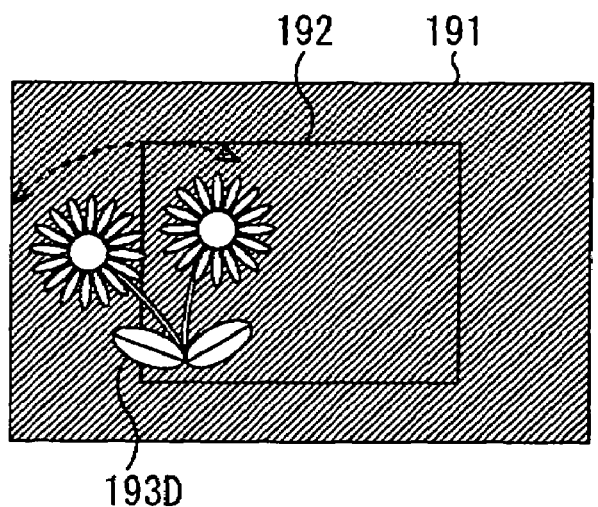
FIGS. 8A and 8B illustrate another AF startup control process of the image pickup apparatus of FIG. 3.

As shown in FIG. 8A, the subject 193D swings, thereby repeatedly entering and leaving the assessment frame 192 in the photographing frame 191. In this case, the assessment value substantially changes. If the AF process is started in response to the change in the assessment value, the AF process is continuously performed while the subject 193D is swinging. If the AF process is performed, the focus position of the photographed image changes due to the wobbling operation. More specifically, when the subject 193D swings, the focus position of the photographed image continuously changes, causing a viewer to feel odd at the image. Particularly when the photographed image is an high-quality and high-definition image, the viewer can view a fine change in the focus position because of high definition. The viewer thus feels more odd at an unwanted change in the focus position.

Figure 8B:
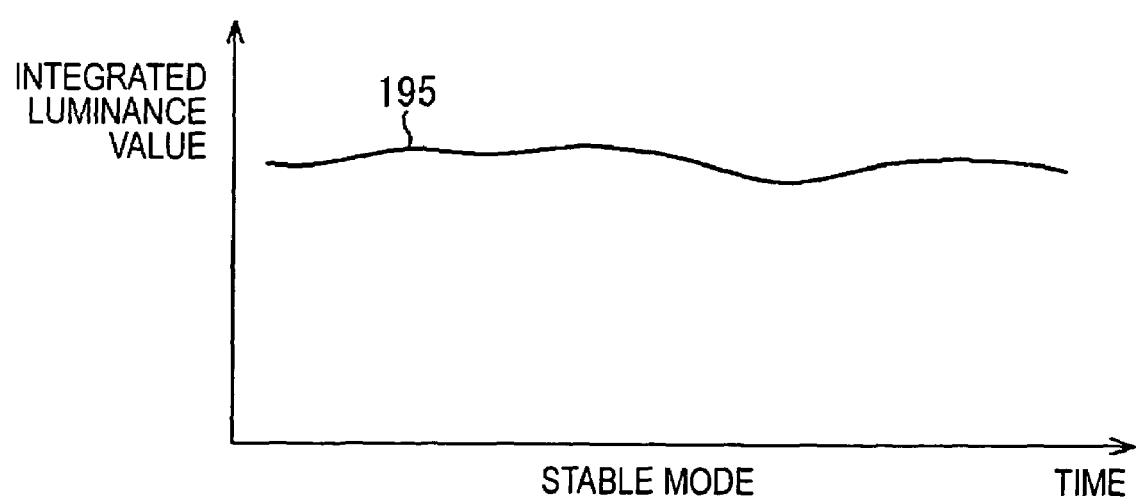

In contrast, the in-field integrated luminance value is calculated over the entire photographing frame 191. Even if the subject 193D swings as shown in FIG. 8A, a curve 195 of FIG. 8B does not change so much as the curve 194 of FIG. 7B. In FIG. 8B, the abscissa represents time and the ordinate represents the in-field integrated luminance value. Even the subject 193D swings within the photographing frame 191, the sum (integrated value) of the luminance value within the entire photographing frame 191 does not change so much. In this case, the mode of the relative angle variation is always a stable mode.

When the AF startup controller 82 performs the AF startup control process using the above-referenced in-field integrated luminance value (the absolute value ABS (p0) of the relative angle variation calculated from the in-field integrated luminance value), no AF process is started. More specifically, the image pickup apparatus 50 controls fine focusing operation focusing on an unnecessary subject (subject 193D), thereby stabilizing the focus position of the photographed image. The generation of the odd image as a result of unnecessary change in the focus position is thus controlled.

As shown in FIGS. 7A, 7B, 8A, and 8B, the in-field integrated luminance value for use in the control of the AF process startup is calculated over the entire photographing frame 191. The assessment value for use in the control of the focus position is calculated over the assessment frame 192 being part of the photographing frame 191. Generally speaking, the smaller the assessment frame 192, the easier the user identifies the subject within the assessment frame 192, and the easier the focus position is controlled. By calculating these values, the user can easily control the focus position in the image pickup apparatus 50. The image pickup apparatus 50 restricts the unnecessary AF process, thereby stabilizing the focus position and performing an appropriate AF startup control.

The area of the calculation of the in-field integrated luminance value may be part of the photographing frame 191 at any location within the photographing frame 191. A plurality of areas (over which the in-field integrated luminance value is calculated) can be set up within the photographing frame 191. The plurality of areas can partly overlap each other, and one area may contains another entire area therewithin among the plurality of areas.

The same is true of the assessment frame 192. The assessment frame 192 can be arranged at any location within the photographing frame 191. The entire photographing frame 191 can be set up as the assessment frame 192. A plurality of assessment frames 192 can be arranged in the photographing frame 191. The plurality of assessment frames 192 can partly overlap each other, and one assessment frame 192 can contain another entire assessment frame 192 therewithin.

The setting of the area of the calculation of the in-field integrated luminance value is, in principle, independent of the setting of the assessment frame 192. As previously discussed, the assessment frame 192 is preferably smaller, and the area of the calculation of the in-field integrated luminance value is preferably larger in order to stabilize the focus position (not to respond to the swinging motion of the subject, for example).

If the area of the calculation of the in-field integrated luminance value does not overlap the assessment frame 192, the in-field integrated luminance value and the assessment value are respectively affected by mutually different subjects. Since the startup of the AF process is typically controlled based on the movement of a subject on which the user focuses on, the area of the calculation of the in-field integrated luminance value preferably contains the assessment frame 192. It is perfectly acceptable if the area of the calculation of the in-field integrated luminance value is intentionally set to be clear of the assessment frame 192. In that case, the AF startup control is performed based on a change in the luminance value in response to the movement of a subject different from a subject on which the user currently focuses.

For example, when illumination is turned on or off during the photographing the illumination, the luminance value changes. In such a case, the AF process can be started even if the subject (illumination) remains stationary. When the subject (illumination) covers half the area of the photographing frame 191 as in wide-end photographing, the area of the calculation of the in-field integrated luminance value is set up in a portion of the photographing frame 191 where no subject (no illumination) is photographed (i.e., set up in a portion not overlapping the assessment frame 192). In this way, the image pickup apparatus 50 performs the AF startup control in a manner free from the effect of the switch on/off of the illumination, thereby reducing the unnecessary AF process. The focus position of the photographed image is thus stabilized.

The area of the calculation of the in-field integrated luminance value may be predetermined or set to be any location within the photographing frame 191 by the user during pre-photographing session or photographing session. In this case, the size and shape of the area of the calculation of the in-field integrated luminance value may be left to the user for setting. Furthermore, a plurality of area candidates of the calculation of the in-field integrated luminance value can be prepared and the user can select and set any one from among the plurality of candidates during the pre-photographing session or the photographing session, as the area of the calculation of the in-field integrated luminance value. The same is true of the assessment frame 192. The assessment frame 192 can be a predetermined one or set flexibly by the user during the pre-photographing session or the photographing session.

If the area of the calculation of the in-field integrated luminance value and the assessment frame 192 are predetermined, the user can photograph in a manner freed from such setting during the photographing session. If the user is permitted to flexibly set the area of the calculation of the in-field integrated luminance value and the assessment frame 192, the user can set the area matching environment and photographing conditions of the subject. The image pickup apparatus 50 thus performs an appropriate AF process as the user intends. Furthermore, the user can easily set the area by simply selecting the area.

As a method of setting the area of the calculation of the in-field integrated luminance value, the user may set an area over which the in-field integrated luminance value is not calculated. In this case, the image pickup apparatus 50 integrates the luminance value over an area other than the area specified by the user to calculate the in-field integrated luminance value, and performs the AF startup control using the resulting in-field integrated luminance value.

Figure 9:
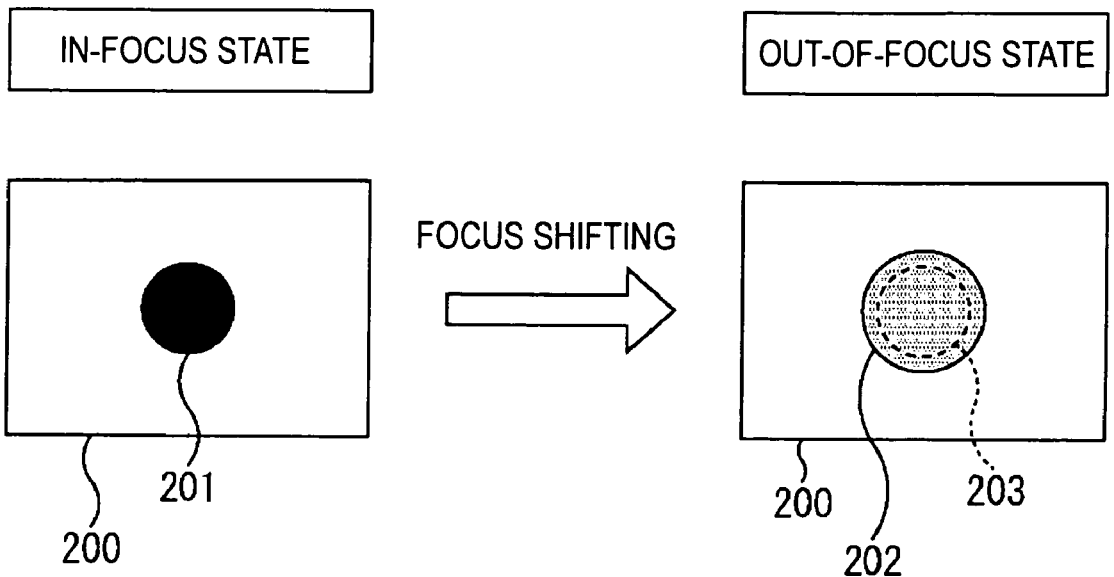
FIG. 9 illustrates a relationship between focus shifting and a captured image.
Figure 10:
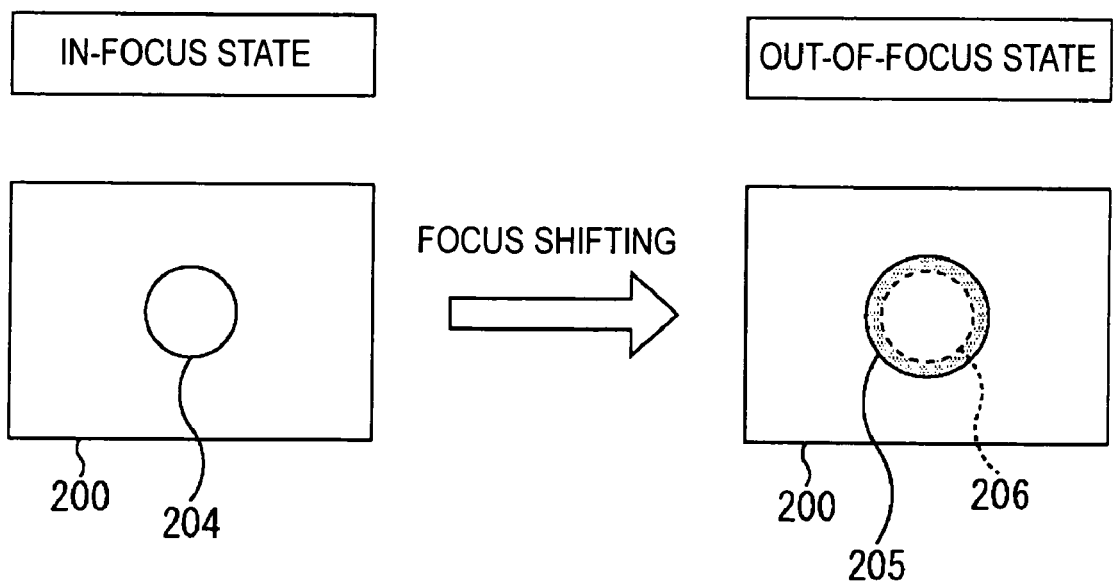
FIG. 10 illustrates another relationship between the focus shifting and the captured image.
Figure 11:
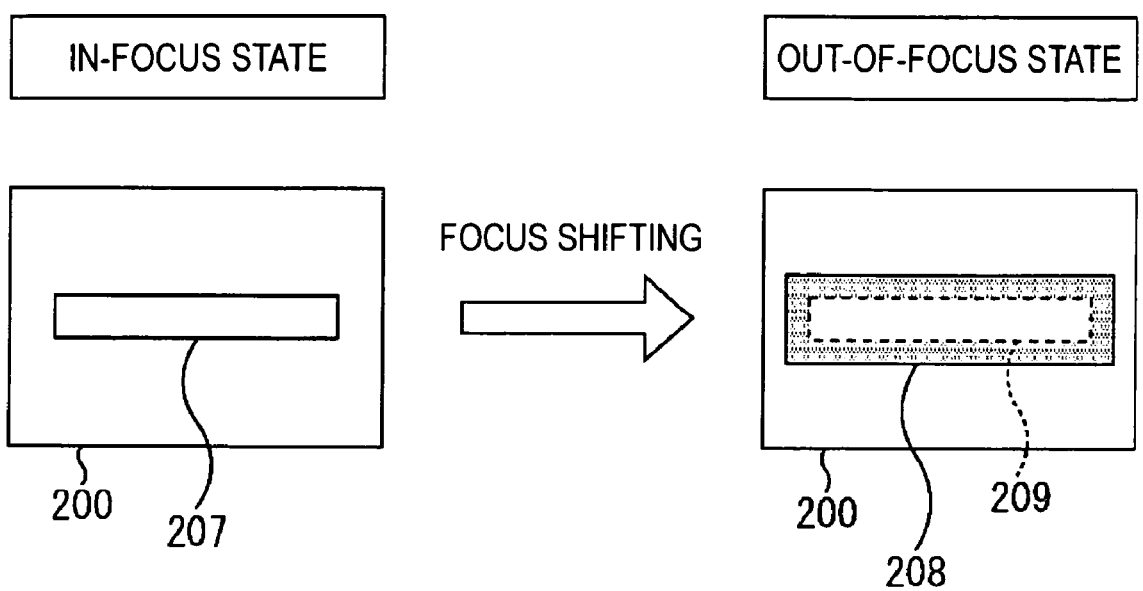
FIG. 11 illustrates yet another relationship between the focus shifting and the captured image.

The relationship between the saturated luminance pixel count and the focus shifting in the photographed image is described below with reference to FIGS. 9 through 11. As shown in FIGS. 9 through 11, a photographed image 200 shown in the left side is captured with the image pickup apparatus 50 in focus on the subject. The photographed image 200 shown on the right side is captured with the image pickup apparatus 50 out of focus on the subject in the wobbling operation.

FIG. 9 illustrates the photographed image of an ordinary subject other than a particular subject such as a light source.

When the image pickup apparatus 50 is in focus on the ordinary subject in the photographed image 200, a subject image 201 has a clear outline with luminance value thereof not saturated as shown in the left portion of FIG. 9. When the focus position is shifted with the subject in an out-of-focus state, the ordinary subject appears as a subject image 202 having the outline thereof blurred as shown in the right portion of FIG. 9. The subject image 202 is larger than the in-focus subject image 201 represented by a broken line circle. As the subject image becomes blurred, each pixel of the subject image 202 drops in luminance value (becoming darker) below the subject image 201.

The sum of the luminance values of the entire photographed image 200 (i.e., the in-field integrated luminance value) does not change greatly, and the mode of the relative angle variation is determined to be the stable mode 171. The (unnecessary) AF process is not started.

FIG. 10 illustrates the photographed image 200 of a saturated luminance subject such as a round light source, having a saturated luminance.

In the photographed image 200, the in-focus image of the round saturated luminance subject becomes a round saturated luminance subject image 204 having a distinct outline in the photographed image 200 as shown in the left portion of FIG. 10. In this case, the luminance value of each pixel in the saturated luminance subject image 204 is saturated. With the focus position shifting to an out-of-focus saturated luminance subject image, the saturated luminance subject image becomes a saturated luminance subject image 205 having a blurred outline as shown in the right portion of FIG. 10. The saturated luminance subject image 205 appears larger than the saturated luminance subject image 204 (in-focus saturated luminance subject image) as represented by a broken line circle 206. The luminance value of the saturated luminance subject image 204 remains saturated even if the focus position is shifted.

The sum of the luminance values of the entire photographed image 200 (in-field integrated luminance value) increases by an amount corresponding to a portion surrounded by the broken line circle 206 and the outline of the saturated luminance subject image 205 in the right portion of FIG. 10 (namely, by an amount corresponding to an portion expanded as a result of the saturated luminance subject image becoming out of focus).

In the wobbling operation, the step of focus position is small. The difference in area between the saturated luminance subject image 205 and the saturated luminance subject image 204 is relatively marginal to the entire area of the saturated luminance subject image 204. An increase in the luminance value does not affect much the sum of the luminance values of the entire photographed image 200 (namely, the in-field integrated luminance value). If the area of the saturated luminance subject image 204 is sufficiently small with respect to the size of the photographed image 200, the increase in the luminance value is infinitesimal relative to the sum of the luminance values of the entire photographed image 200 (i.e., the in-field integrated luminance value). The in-field integrated luminance value does not change much in response to the increase. It is thus determined that the mode of the relative angle variation is the stable mode 171, the (unnecessary) AF process is not started.

FIG. 11 illustrates a bar-like saturated luminance subject image of an elongated-bar-like light source having the luminance value thereof saturated.

The in-focus image of a bar-like saturated luminance subject in the photographed image 200 becomes a bar-like saturated luminance subject image 207 having a distinct outline as shown in the left portion of FIG. 11. The luminance value of each pixel of the bar-like saturated luminance subject image 207 is saturated. With the focus position of the bar-like saturated luminance subject shifting to an out-focus-focus state, the image of the bar-like saturated luminance subject becomes a bar-like saturated luminance subject image 208 having a blurred outline as shown in the right portion of FIG. 11. The bar-like saturated luminance subject image 208 appears larger than the bar-like saturated luminance subject image 207 represented by a broken line circle 209 (a bar-like saturated luminance subject image in an in-focus state). The luminance value of the bar-like saturated luminance subject image 207 remains saturated even with the focus position shifting.

Since the bar-like saturated luminance subject image 207 is an elongated bar-like image, a difference in area between the bar-like saturated luminance subject image 208 and the bar-like saturated luminance subject image 207 becomes relatively significant with respect to the entire area of the bar-like saturated luminance subject image 207.

For example, the bar-like saturated luminance subject image 207 is an image of one pixel by 100 pixels, and an image is now successively expanded one pixel by one pixel with the bar-like saturated luminance subject image becoming out of focus. The resulting bar-like saturated luminance subject image 208 is then an image of three pixels by 102 pixels, thereby having an area three times larger than the bar-like saturated luminance subject image 207. In the case of FIG. 10, the saturated luminance round subject image 204 is a circular image having a radius of 10 pixels, and it is assumed now that the image becomes wider one pixel by one pixel as the saturated luminance subject image becomes out of focus. In such a case, the saturated luminance subject image 205 is a round image having a radius of 11 pixels, and has an area approximately equal to that of the saturated luminance subject image 204 (i.e., has an area 1.2 times the area of the saturated luminance subject image 204).

For example, a light source is photographed through a window shade. In such a case, the bar-like saturated luminance subject images 207 may be distributed at intervals of several pixels over the entire photographed image 200. An increase in the luminance value due to out-of-focus state (in the wobbling operation) can become significantly large with respect to the sum of the luminance values of the entire photographed image 200 (i.e., the in-field integrated luminance value).

When an elongated bar-like saturated luminance subject is photographed as shown in FIG. 11, a change in the in-field integrated luminance value caused in response to a change in the focus position due to the wobbling operation can become sufficiently large unlike the case shown in FIG. 10. If the mode determiner 141 attempts to determine the mode of the relative angle variation in a manner similar to the ordinary subject as shown in FIG. 9, the mode determiner 141 can determine the mode as the unstable mode 172. Subsequent to the AF process, the mode change pattern determiner 146 determines that the mode has been shifted from the unstable mode 172 to the stable mode 171, and the (unnecessary) AF process can be started up again.

The startup condition adjuster 84 reduces such a possibility by adjusting the threshold value (startup condition) for use in the mode determination.

The threshold selector 155 in the startup condition adjuster 84 determines the magnitude of the change in the saturated luminance pixel count (i.e., the ratio of the maximum count to the minimum count) during the wobbling operation by referencing equation (2). The threshold selector 155 thus determines whether the subject is a bar-like saturated luminance subject, and then selects a stable mode threshold value based on the determination result. For example, if the subject is not a bar-like saturated luminance subject, the threshold selector 155 selects the value $\alpha$ as the stable mode threshold value, and sets the value $\alpha$ to the threshold holder 143. If the subject is a bar-like saturated luminance subject, the threshold selector 155 selects the value $3\alpha$ as the stable mode threshold value, larger than the value $\alpha$ (with harder condition), and sets the value $3\alpha$ to the threshold holder 143.

Figure 12:
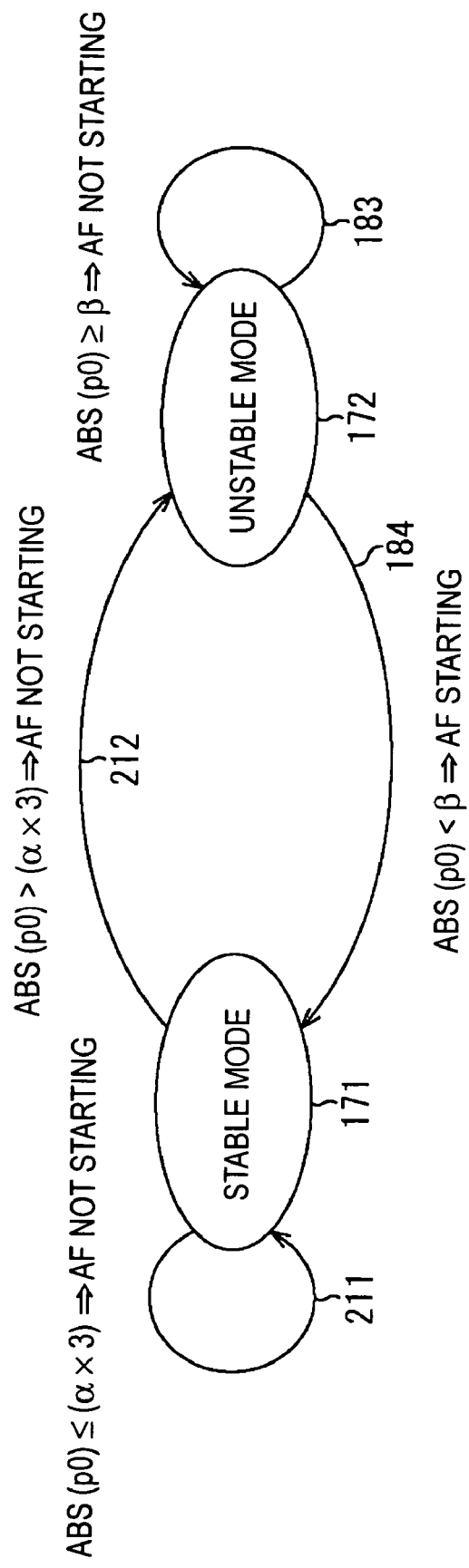
FIG. 12 illustrates a relationship between a mode shifting determination and AF driving.

As shown in FIG. 12, the mode is shifted from the stable mode 171 to the unstable mode 172 when the absolute value of the relative angle variation rises above the threshold value $3\alpha$. With the absolute value of the relative angle variation less than the threshold value $3\alpha$, the mode in the new period is determined as being also the stable mode 171, and no mode change takes place as represented by an arrow-headed curved line 211. A mode change takes place only when the absolute value of the relative angle variation is above the threshold value $3\alpha$, and the mode is shifted from the stable mode 171 to the unstable mode 172 as represented by an arrow-headed curved line 212.

When the bar-like saturated luminance subject is photographed as shown in FIG. 11, the threshold selector 155 selects, as a stable mode threshold value, a threshold value larger than a threshold value for photographing a subject other than a bar-like saturated luminance subject. The condition for shifting the mode of the relative angle variation from the stable mode 171 to the unstable mode 172 is thus set to be harder. The AF startup controller 82 thus restricts the startup of the unnecessary AF process. The image pickup apparatus 50 performs a reliable AF process, thereby resulting in a high-quality image.

The subject for allowing the threshold selector 155 to select a threshold value other than the stable mode threshold value may not be the bar-like saturated luminance subject. Any subject is perfectly acceptable as long as the subject provides a condition determination equation that permits the subject itself to be determined. In other words, the condition determination equation for use in the selection of the threshold value may also be an equation other than equation (2). The threshold value selected by the threshold selector 155 may be any value. Furthermore, three or more threshold values may be used (with a plurality of condition determination equations applied).

The above-described processes are detailed below. The AF startup control process of the AF startup controller 82 is described below with reference to a flowchart of FIG. 13.

Upon being supplied with the video signal (such as a field image or a frame image) by the signal processor 73, the relative angle variation calculator 121 in the AF startup controller 82 executes a relative angle variation calculation process in step S1. The relative angle variation calculation process will be described later with reference to a flowchart of FIG. 14.

Upon completing the relative angle variation calculation process, the mode change detector 122 executes a mode change detection process in step S2. The mode change detection process will be described with reference to a flowchart of FIG. 15.

Upon completing the mode change detection process, the AF startup command output unit 123 determines in step S3 whether to start the AF process based on the mode change detection process. When the mode of the relative angle variation is determined as described above as being shifted from the unstable mode 172 to the stable mode 171, and the AF process is determined as being started, the AF startup command output unit 123 outputs the AF startup command to the AF control processor 83 in step S4. After starting the AF process, the AF startup command output unit 123 completes the AF control process. If it is determined in step S3 that the mode of the relative angle variation has not been shifted from the unstable mode 172 to the stable mode 171, and that the AF process remains to be started, the AF startup command output unit 123 skips step S4, thereby ending the AF startup control process.

Figure 14:
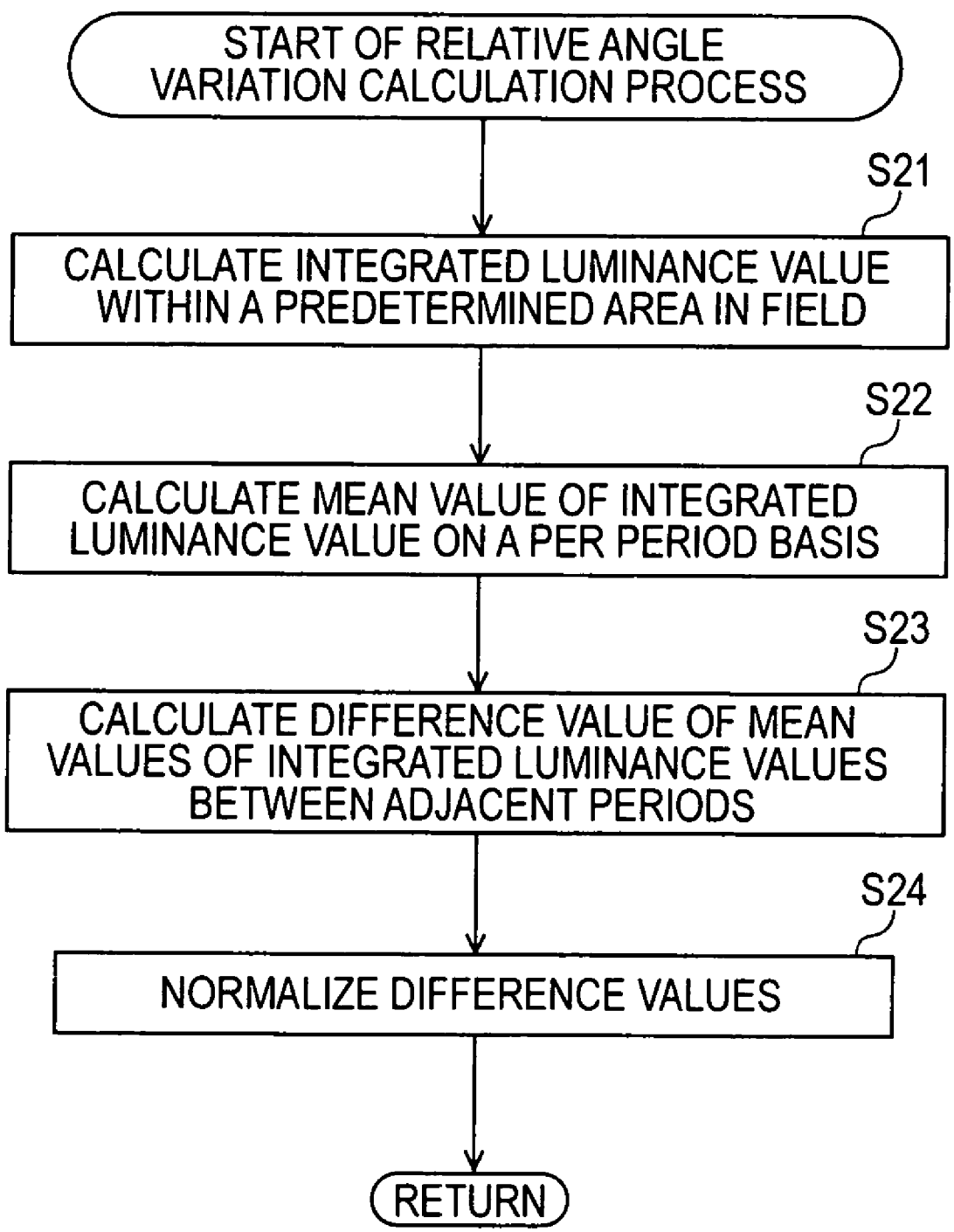
FIG. 14 is a flowchart illustrating in detail a relative angle variation calculation process.

The relative angle variation calculation process to be executed in step S1 of FIG. 13 is described below with reference to the flowchart of FIG. 14.

When the relative angle variation calculation process starts with the video signal supplied by the signal processor 73, the in-field integrated luminance value calculator 131 calculates in step S21 the integral value of the luminance values (in-field integrated luminance value) in a predetermined area in a field (the predetermined area being set up by the area setter 132 in the photographing frame) based on the supplied video signal.

In step S22, the period mean integrated luminance value calculator 133 calculates the mean value of the integrated luminance value in each period (period mean integrated luminance value) in cooperation with the period mean integrated luminance value holder 134. In step S23, the difference calculator 135 calculates the difference value of the period mean integrated luminance value of adjacent periods (the latest period and the immediately prior period). In step S24, the normalizer 136 normalizes the difference value, calculated in step S23, with the latest in-field integrated luminance value and the field count, thereby determining the relative angle variation. Subsequent to step S24, the normalizer 136 completes the relative angle variation calculation process, and returns to step S1 of FIG. 13 to perform step S2 and subsequent steps.

Figure 15:
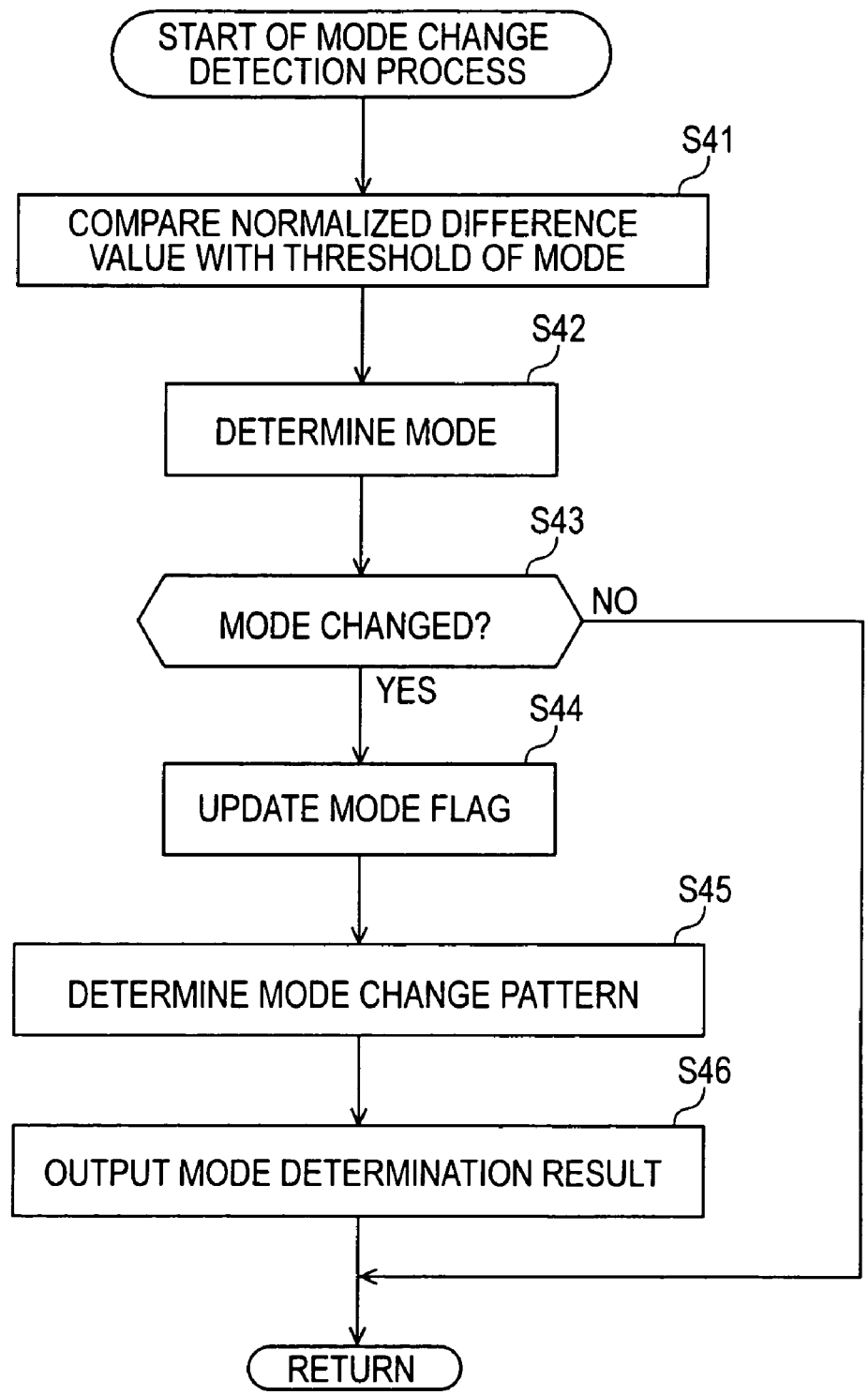
FIG. 15 is a flowchart illustrating in detail a mode change detection process.

The mode change detection process to be executed in step S2 of FIG. 13 is described below with reference to the flowchart of FIG. 15.

When the mode change detection process starts, the mode determiner 141 compares in step S41 the relative angle variation as the difference value normalized in step S41 with the threshold value corresponding to the mode in the immediately prior period obtained by referencing the mode flag 142 and the threshold holder 143 (threshold value selected and set by the startup condition adjuster 84). In step S42, the mode determiner 141 determines the latest mode. In step S43, the update verifier 144 determines whether the mode has changed. If the update verifier 144 determines that the mode has changed, processing proceeds to step S44. In step S44, the mode updater 145 updates the value in the mode flag 142. The mode change pattern determiner 146 determines the mode change pattern in step S45, and outputs the mode determination result to the AF startup command output unit 123. The mode change pattern determiner 146 completes the mode change detection process, and then returns to step S2 of FIG. 13. The AF startup controller 82 performs step S3 and subsequent steps.

If it is determined in step S43 that the mode has not changed, the update verifier 144 completes the mode change detection process skipping steps S44 through S46, and then returns to step S2 of FIG. 13. The AF startup controller 82 performs step S3 and subsequent steps.

With the above-referenced steps performed, the AF startup controller 82 easily reduces the AF process, and achieves a more precise AF process, thereby resulting in a high-quality image.

The one-shot AF control process started in response to an AF startup command output in step S4 of FIG. 13 is described below with reference to a flowchart of FIG. 16.

When the one-shot AF control process is started, the AF control processor 83 causes in step S61 the startup condition adjuster 84 to start a startup condition adjusting process. The startup condition adjusting process will be described later with reference to a flowchart of FIG. 17. In step S62, the AF control processor 83 controls the driver controller 64 to drive the wobbling lens 62 in the wobbling operation and to determine the direction of movement of the focusing lens 61. From the image photographed in the wobbling operation, the startup condition adjuster 84 determines whether the above-referenced bar-like saturated luminance subject is present in the image, and selects and sets the threshold value of the mode determination based on the determination result. When the wobbling operation ends, the AF control processor 83 controls the driver controller 64 in step S63, thereby moving the focusing lens 61 in the direction determined in the wobbling operation, and calculates the assessment value assessing the out-of-focus level of the photographed image using the assessment value calculator 81. The AF control processor 83 performs a focus position search process for searing for an optimum focus position based on the calculated assessment value. When the optimum focus position is found, the AF control processor 83 controls the driver controller 64, thereby driving the focusing lens 61 to the found optimum focus position in focusing operation. When the focusing lens 61 reaches the in-focus state, the AF control processor 83 completes the one-shot AF control process.

Figure 16:
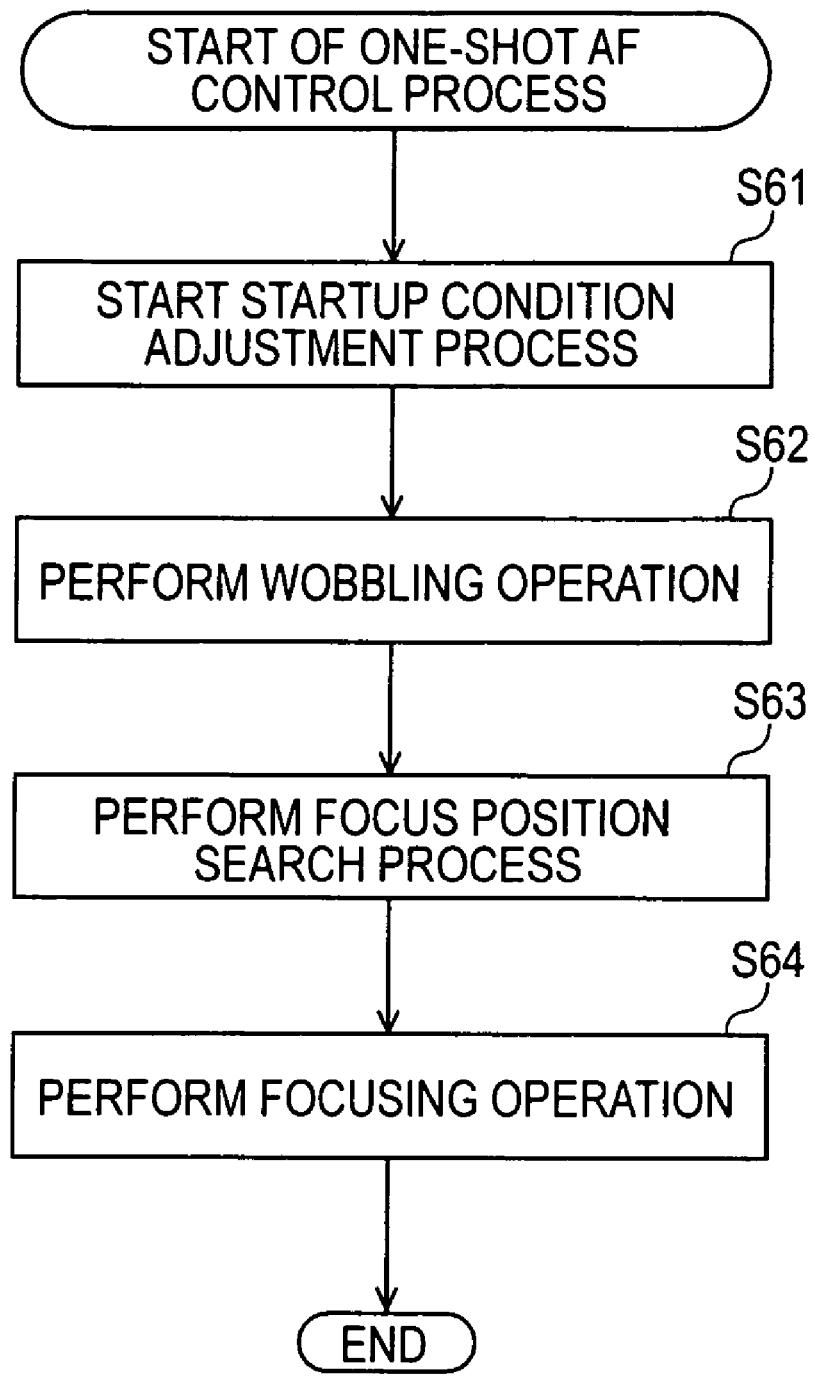
FIG. 16 is a flowchart illustrating a one-shot AF control process.
Figure 17:
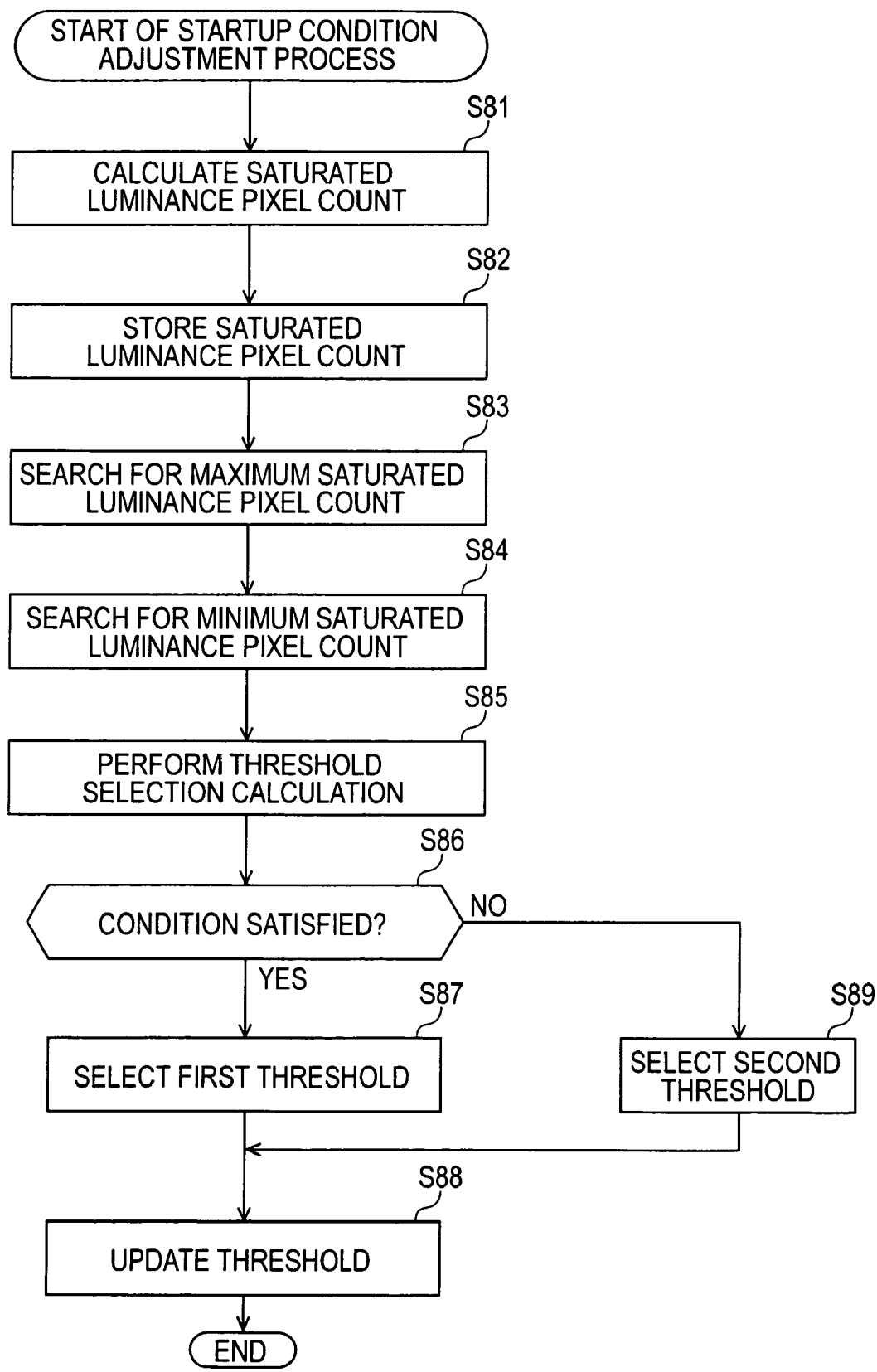
FIG. 17 is a flowchart illustrating a startup condition adjustment process.

The startup condition adjuster 84 starts the startup condition adjusting process in response to the start command given by the AF control processor 83 in step S61 of FIG. 16. The startup condition adjusting process is described below with reference to a flowchart of FIG. 17.

When the startup condition adjusting process is started, the saturated luminance pixel count calculator 151 in the startup condition adjuster 84 calculates in step S81 the saturated luminance pixel count in the wobbled photographed image using the video signal acquired from the signal processor 73. More specifically, the saturated luminance pixel count calculator 151 calculates the saturated luminance pixel counts of the field video signal of the M fields. The saturated luminance pixel count calculator 151 supplies successively information regarding the calculated saturated luminance pixel counts to the saturated luminance pixel count history holder 152 for storage.

In step S82, the saturated luminance pixel count history holder 152 stores, as history, the information regarding the saturated luminance pixel count. When the history of the M fields is already stored, the saturated luminance pixel count history holder 152 deletes the oldest stored portion and stores the information of new saturated luminance pixel count.

In step S83, the saturated luminance maximum pixel count searcher 153 searches for and acquires the maximum of the saturated luminance pixel counts in the history stored on the saturated luminance pixel count history holder 152. The saturated luminance maximum pixel count searcher 153 supplies the acquired maximum count to the threshold selector 155 and notifies the saturated luminance minimum pixel count searcher 154 of the completion of the process. In step S84, the saturated luminance minimum pixel count searcher 154 searches for and acquires the minimum of the saturated luminance pixel counts from the history stored on the saturated luminance pixel count history holder 152. The saturated luminance minimum-pixel count searcher 154 supplies the acquired minimum count to the threshold selector 155 and notifies the threshold selector 155 of the completion of the process.

In step S85, the threshold selector 155 performs a threshold value selection calculation by calculating equation (2). In step S86, the threshold selector 155 determines whether the calculation result satisfies the condition determination equation (2). If it is determined that equation (2) is satisfied, the threshold selector 155 processing proceeds to step S87. The threshold selector 155 selects a first threshold value (a) as a threshold value for the ordinary subject, and supplies the first threshold value to the threshold updater 156. Upon receiving the first threshold value, the threshold updater 156 updates the threshold value stored on the threshold holder 143 with that threshold value in step S88. When updating ends, the threshold updater 156 completes the startup condition adjusting process.

If it is determined in step S86 that equation (2) is not satisfied, the threshold selector 155 processing proceeds to step S89. The threshold selector 155 then selects a second threshold value ($3\alpha$) as the threshold value for the bar-like saturated luminance subject, for example, and supplies the second threshold value to the threshold updater 156. Upon receiving the third threshold value, the threshold updater 156 updates the threshold value stored on the threshold holder 143 with the second threshold value in step S88. When updating ends, the threshold updater 156 completes the startup condition adjusting process.

The startup condition adjuster 84 adjusts the startup condition (threshold value) using the saturated luminance pixel count of the photographed image. Even if the subject is a special subject such as a bar-like saturated luminance subject, the image pickup apparatus 50 easily reduces unnecessary AF process, and performs a more precise AF process, thereby resulting in a high-quality image.

As previously discussed, the presence of the bar-like saturated luminance subject greatly affects the in-field integrated luminance value even if the startup condition adjuster 84 sets a high stable-mode threshold value ($3\alpha$). During panning operation or tilting operation, a change in luminance as a result of movement of a subject (bar-like saturated luminance subject) is sufficiently large with respect to the threshold value, and the mode is shifting to an unstable mode as when a low threshold value ($\alpha$) is set. The startup condition adjuster 84 adjusts a modification rate of the threshold value so that the AF startup is not adversely affected with the mode determination practically not influenced during the panning operation or the tilting operation.

In the above discussion, the startup condition adjuster 84 adjusts the startup condition (threshold value) using the image photographed in the wobbling operation. However, the timing of the adjustment is not limited to any particular one. The adjustment of the startup condition can be started at any time. For example, the startup condition adjuster 84 can periodically start the startup condition adjusting process, or can start the startup condition adjusting process at a timing different from the discussed above. The wobbling operation can be performed to calculate the saturated luminance pixel count.

In the above discussion, the change in the relative angle of the camera with respect to the subject, as a parameter for controlling the AF process startup, is based on the luminance value of the photographed image. The parameter is not limited to the luminance value. The parameter can be calculated using a value other than the luminance value, such as a value regarding contrast. Calculation method is not limited to the one described above. In the above discussion, the mean value of the in-field integrated luminance value is calculated on each period, and the relative angle variation is calculated using the mean value. Alternatively, instead of the integrated luminance value, the mean value of the luminance values can be used. Instead of the mean value of the in-field integrated luminance value on each period, the sum of the in-field integrated luminance values can be used to calculate the relative angle variation. The mean values of the luminance values determined on a field by field basis are averaged on a per period basis to calculate the relative angle variation. The normalization operation can be performed using another value such as mean integrated luminance value on a per period basis, instead of the latest in-field luminance values and the field count. Even the entire normalization operation can be omitted.

A value other than the change in the relative angle of the camera with respect to the subject can be used as a parameter for controlling the AF process startup. Another value other than the change in the relative angle of the camera with respect to the subject can be used together with the change in the relative angle of the camera with respect to the subject.

The above-described process steps may be performed using hardware or software. If the process steps are performed using software, a computer program forming the software can be installed from a recording medium or via a network.

The recording medium may include the removable medium 97 that is supplied separate from the apparatus body to supply the user with the computer program. The recording medium may also include the ROM 91 or the recording unit 94 (including a hard disk), each of which stores the computer program and is supplied in the apparatus body to the user.

The process steps forming the computer program stored on the recording medium can be performed in the sequential time-series order stated herein. Alternatively, the process steps may be performed in parallel or separately.

The apparatus described herein can be split among a plurality of units. Alternatively, an arrangement described as a plurality of units can be integrated into a single apparatus. An element, which is not described above, can be added to the system. As long as the entire apparatus remains unchanged in structure and operation, a portion of one unit can be included into another unit.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for controlling a driver driving an optical element of an image pickup device to adjust a focus position of the image pickup device in the capturing of an image of a subject, the control apparatus comprising:

focus position control process startup means for managing a startup of a focus position control process, the focus position control process for controlling the focus position through controlling the driver in response to a change pattern of a relative angle variation, the relative angle variation being a change per unit time of a relative angle of the image pickup device with respect to the subject;

focus position control process executing means for executing the focus position control process that is started under the control of the focus position control process startup means; and startup condition adjusting means for adjusting a startup condition of the focus position control process, started by the focus position control process startup means, based on a change in a saturated luminance count contained in the image captured in the focus position control process executed by the focus position control process executing means.

2. The control apparatus according to claim 1, wherein the focus position control process startup means determines based on a threshold value whether a mode of the relative angle variation is a stable mode involving a small amount of change or an unstable mode involving a large amount of change, and manages the start of the focus position control process in response to a pattern of change of the mode.

3. The control apparatus according to claim 2, wherein the startup condition adjusting means adjusts the threshold value as the startup condition in response to the change in the saturated luminance count, and wherein the focus position control process startup means determines the mode of the relative angle variation using the threshold value adjusted by the startup condition adjusting means.

4. The control apparatus according to claim 3, wherein the startup condition adjusting means adjusts the threshold value according to which the mode of the relative angle variation is shifted from the stable mode to the unstable mode.

5. The control apparatus according to claim 2, wherein the startup condition adjusting means comprises:

saturated luminance count calculating means for calculating the saturated luminance count of the captured image on a per field basis; and threshold selecting means for selecting the threshold value in response to the change in the saturate luminance count based on the maximum value and the minimum value of the saturated luminance count, each calculated on a per field basis by the saturated luminance count calculating means, and wherein the focus position control process startup means determines the mode of relative angle variation using the threshold value selected by the threshold selecting means.

6. The control apparatus according to claim 5, wherein the saturated luminance count calculating means calculates, on a per field basis, the saturated luminance count of the image captured in the focus position control process during a wobbling operation.

7. A control method of a control apparatus for controlling a driver driving an optical element of an image pickup device to adjust a focus position of the image pickup device in the capturing of an image of a subject, the control method comprising:

a focus position control process executing step of executing a focus position control process for controlling the focus position through controlling the driver;

a startup condition adjusting step of adjusting a startup condition of the focus position control process, based on a change in a saturated luminance count contained in the image captured in the focus position control process executed in the focus position control process executing step;

a startup determination step of determining whether to start up the focus position control process, based on the startup condition adjusted in the startup condition adjusting step, and a change pattern of a relative angle variation, the relative angle variation being a change per unit time of a relative angle of the image pickup device with respect to the subject; and a focus position control process startup step of causing the driver to adjust the focus position through starting the focus position control process based on the determination result of the startup determination step.

8. A computer readable storage medium encoded with a computer readable program configured to cause an information processing apparatus to execute a method for controlling a driver driving an optical element of an image pickup device to adjust a focus position of the image pickup device in the capturing of an image of a subject, the method comprising:

a focus position control process executing step of executing a focus position control process for controlling the focus position through controlling the driver;

a startup condition adjusting step of adjusting a startup condition of the focus position control process, based on a change in a saturated luminance count contained in the image captured in the focus position control process executed in the focus position control process executing step;

a startup determination step of determining whether to start up the focus position control process, based on the startup condition adjusted in the startup condition adjusting step, and a change pattern of a relative angle variation, the relative angle variation being a change per unit time of a relative angle of the image pickup device with respect to the subject; and a focus position control process startup step of causing the driver to adjust the focus position through starting the focus position control process based on the determination result of the startup determination step.

9. A control apparatus for controlling a driver driving an optical element of an image pickup device to adjust a focus position of the image pickup device in the capturing of an image of a subject, the control apparatus comprising:

a focus position control process startup unit managing a startup of a focus position control process, the focus position control process for controlling the focus position through controlling the driver in response to a change pattern of a relative angle variation, the relative angle variation being a change per unit time of a relative angle of the image pickup device with respect to the subject;

a focus position control process executing unit executing the focus position control process that is started under the control of the focus position control process startup unit; and a startup condition adjusting unit adjusting a startup condition of the focus position control process, started by the focus position control process startup unit, based on a change in a saturated luminance count contained in the image captured in the focus position control process executed by the focus position control process executing unit.

10. The control apparatus according to claim 9, wherein the focus position control process startup unit is further configured to determine based on a threshold value whether a mode of the relative angle variation is a stable mode involving a small amount of change or an unstable mode involving a large amount of change, and to manage the start of the focus position control process in response to a pattern of change of the mode.

11. The control apparatus according to claim 10, wherein the startup condition adjusting unit is configured to adjust the threshold value as the startup condition in response to the change in the saturated luminance count, and wherein the focus position control process startup unit determines the mode of the relative angle variation using the threshold value adjusted by the startup condition adjusting unit.

12. The control apparatus according to claim 11, wherein the startup condition adjusting unit is configured to adjust the threshold value according to which the mode of the relative angle variation is shifted from the stable mode to the unstable mode.

13. The control apparatus according to claim 10, wherein the startup condition adjusting unit comprises:

a saturated luminance count calculating unit configured to calculate the saturated luminance count of the captured image on a per field basis; and a threshold selecting unit configured to select the threshold value in response to the change in the saturate luminance count based on the maximum value and the minimum value of the saturated luminance count, each calculated on a per field basis by the saturated luminance count calculating unit, and wherein the focus position control process startup unit is configured to determine the mode of relative angle variation using the threshold value selected by the threshold selecting unit.

14. The control apparatus according to claim 13, wherein the saturated luminance count calculating unit is configured to calculate, on a per field basis, the saturated luminance count of the image captured in the focus position control process during a wobbling operation.

* * * * *